United States Patent
Tse et al.

(10) Patent No.: US 11,311,916 B2
(45) Date of Patent: Apr. 26, 2022

(54) PEANUT MATURITY GRADING SYSTEMS AND METHODS

(71) Applicant: University of Georgia Research Foundation, Inc., Athens, GA (US)

(72) Inventors: Tsz Ho Tse, Lawrenceville, GA (US); Brian Boland, Athens, GA (US); Donald Leo, Athens, GA (US); Kyle Johnsen, Athens, GA (US); Zhuo Zhao, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 17/012,764

(22) Filed: Sep. 4, 2020

(65) Prior Publication Data

US 2020/0398316 A1 Dec. 24, 2020

Related U.S. Application Data

(63) Continuation-in-part of application No. 16/561,650, filed on Sep. 5, 2019.

(60) Provisional application No. 62/727,247, filed on Sep. 5, 2018, provisional application No. 62/896,272, filed on Sep. 5, 2019.

(51) Int. Cl.
  *B07C 5/342* (2006.01)
  *A01G 22/40* (2018.01)

(52) U.S. Cl.
  CPC .......... *B07C 5/3422* (2013.01); *A01G 22/40* (2018.02)

(58) Field of Classification Search
  CPC .......... A01G 224/00; B07C 5/34; B07C 5/342
  USPC .......................................... 209/577
  See application file for complete search history.

(56) References Cited

U.S. PATENT DOCUMENTS

| | | | | |
|---|---|---|---|---|
| 1,477,648 A | * | 12/1923 | Huston | A23N 5/01 460/141 |
| 1,614,471 A | * | 1/1927 | Andrewt | A63F 7/0058 273/123 A |
| 5,488,479 A | * | 1/1996 | Williams | B07C 5/3422 209/587 |
| 2008/0101657 A1 | * | 5/2008 | Durkin | G01N 21/6456 382/110 |
| 2013/0306735 A1 | * | 11/2013 | Vinogradov | G06K 7/10732 235/470 |

OTHER PUBLICATIONS

Andrade et al., Intercepted radiation at flowering and kernel number in maize, vol. 92, No. 1, pp. 92-97, 2000.

Bindlish et al., Assessment of peanut pod maturity. Proc. IEEE Winter Conf. on Applications of Computer Vision (WACV) (pp. 688-696). Piscataway, NJ: IEEE. https://doi.org/10.1109/WACV.2017.82, 2017.

(Continued)

*Primary Examiner* — Terrell H Matthews
(74) *Attorney, Agent, or Firm* — Thomas | Horstemeyer, LLP

(57) ABSTRACT

The present disclosure provides peanut maturity grading systems and methods for quickly, efficiently, and objectively determining a peanut maturity grade for a crop of peanuts and determining an optimal harvest time for the crop. Embodiments of systems and methods of the present disclosure can be performed in the field or field-side and do not require assistance of a trained peanut grading specialist.

20 Claims, 23 Drawing Sheets
(20 of 23 Drawing Sheet(s) Filed in Color)

(56) References Cited

OTHER PUBLICATIONS

Boldor et al., Computer-Assisted Color Classification of Peanut Pods. Peanut Science, 29(1), 41-46. doi:10.3146/onut.29.1.0008, 2002.
Cober et al., Photoperiod and Temperature Responses in Early-Maturing, Near-Isogenic Soybean Lines, Crop Sci. 41:721-727, 2001.
Colvin et al., Development of a Digital Analysis System to Evaluate Peanut Maturity, Peanut Science, 41:8-16, 2014.
Daigle et al., Peanut Hull Flavonoids: Their Relationship with Peanut Maturity, J. Agric. Food Chem., 36, 1179-1181, 1988.
Dietzgen, Elimination of Aflatoxin Contamination in Peanut, Canberra, ACIAR Proceedings No. 89, p. 98.
Dufault, Determining Heat Unit Requirements for Broccoli Harvest in Coastal South Carolina, J. Amer. Soc. Hort. Sci., 122(2):169-174, 1997.
Ghate et al., Maturity Detection in Peanuts (*Arachis Hypogaea* L.) Using Machine Vision, American Society of Agricultural Engineers, vol. 36(6): 1941-1947, 1993.
Holaday et al., A Method for Estimating Peanut Maturity, Journal of Food Science, vol. 44, No. 1, 254-256, 1979.
Johnson et al., Evaluation of the Arginine Maturity Index (AMI) Method of Maturity Estimation for Virginia Type Peanuts1, Peanut Science, p. 32-36.
Lamb et al., Impact of Sprinkler Irrigation Amount and Rotation On Peanut Yield, Peanut Science, 31:108-113, 2004.
Liang et al., Estimation of Peanut Maturity Using Color Image Analysis, Annual International Meeting, p. 2-16, 2018.
Lopez et al., Genetic Factors Influencing High Oleic Acid Content in Spanish Market-Type Peanut Cultivars, Published in Crop Sci. 41:51-56, 2001.
Miller et al., Internal Color of Spanish Peanut Hulls as an Index of Kernel Maturity, Journal of Food Science, vol. 36, p. 669-670, 1971.
Mozingo et al., The Influence of Planting and Digging Dates on Yield, Value, and Grade of Four Virginia-type Peanut Cultivars1, Peanut Science, 18:55-62, 1991.
Narendra et al., Cashew Kernels Classification Using Colour Features, IJMI, vol. 3, Issue 2, p. 52-57, 2011.
National Peanut Board, Peanut Country, U.S.A., 2018.
NCSE, Maturity Profile Board for Virginia-Type Peanuts.
NeSmith et al., Variation in the Onset of Flowering of Summer Squash as a Function of Days and Heat Units, J. Amer. Soc. Hort. Sci. 119(2):249-252, 1994.
Pattee et al., Composition Changes of Peanut Fruit Parts During Maturation1, Peanut Science, p. 57-62.
Pattee et al., The Seed-Hull Weight Ratio as an Index of Peanut Maturity 1,2, Peanut Science, vol. 4, No. 2, p. 47-50, 1977.
Perry et al., Heat units to predict tomato harvest in the southeast USA, Agricultural and Forest Meteorology 84, 249-254, 1997.
Rowland et al., Determination of Maturity and Degree Day Indices and their Success in Predicting Peanut Maturity1, Peanut Science, 33:125-136, 2006.
Rucker et al.. Sorting Peanuts by Pod Density to Improve Quality and Kernel Maturity Distribution and to Reduce Aflatoxin, Peanut Science, 21:147-152, 1994.
Sanders et al., Oil Characteristics of Peanut Fruit Separated by a Nondestructive Maturity Classification Method, Peanut Science, 9, 20-23, 1982.
Sanders et al., Peanut Maturity Method Evaluations. I. Southeast, Peanut Science, 7, 78-82, 1980.
Shahin et al., Fuzzy Logic Model for Predicting Peanut Maturity, American Society of Agricultural Engineers, vol. 43(2):483-490, 2000.
Srinivasan et al., Three decades of managing Tomato spotted wilt virus in peanut in southeastern United States, Virus Research, 241, 203-212, 2017.
Turner et al., Factors Relating to Peanut Yield Increases After Seed Treatment with *Bacillus subtilis*, Plant Disease, p. 347-353, 1991.
USDA, Crop Production Summary, 2018.
USDA, Oilseeds: World Markets and Trade, 2018.
USDA, Shelled Walnuts Grades and Standards, 2017.
Viator et al., Predicting Cotton Boll Maturation Period Using Degree Days and Other Climatic Factors, Agron. J. 97:494-499, 2005.
Williams et al., A Non-Destructive Method for Determining Peanut Pod Maturity, Peanut Science, 8, 134-141, 1981.
Yen et al., Relationship between Antioxidant Activity and Maturity of Peanut Hulls, J. Agrie. Food Chem., 41. 67-70, 1993.
Young et al., Harvesting, Curing and Energy Utilization, Peanut Science and Technology, p. 459-485.

* cited by examiner

Examples of prices of 4 types of peanuts in dashboard view

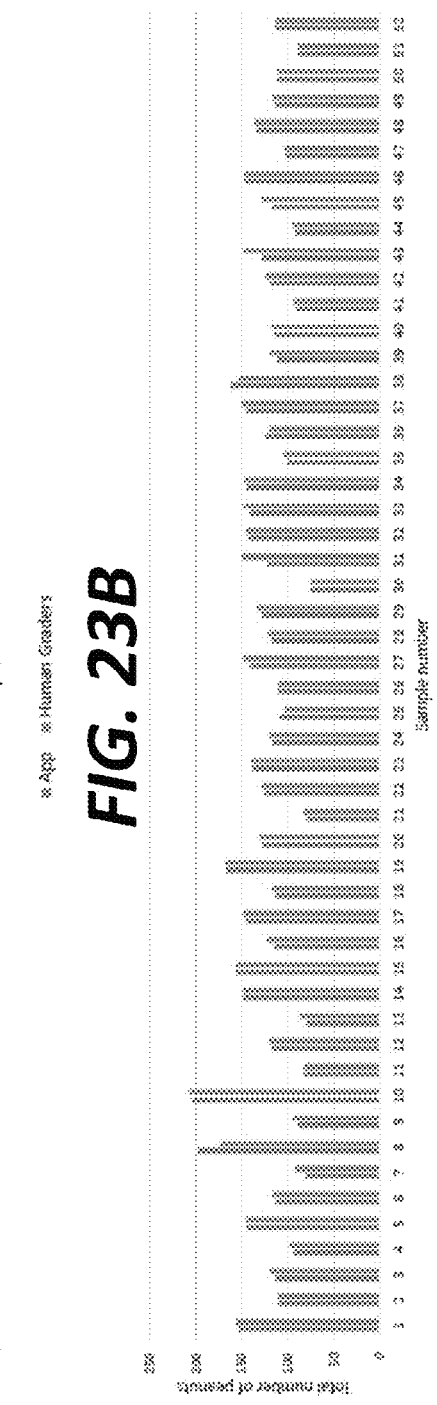
FIG. 23A
FIG. 23B
FIG. 23C

The scan window includes the background color

The scan window overlaps with the peanut sample

PEANUT MATURITY GRADING SYSTEMS AND METHODS

CROSS-REFERENCE TO RELATED APPLICATIONS

This application is a continuation-in-part of U.S. patent application Ser. No. 16/561,650 filed Sep. 5, 2019, which claims priority to, and the benefit of, U.S. provisional application entitled "PEANUT MATURITY GRADING SYSTEMS AND METHODS" having Ser. 62/727,247 filed Sep. 5, 2018, which is incorporated by reference in its entirety.

This application also claims priority to, and the benefit of, U.S. provisional application entitled "PEANUT MATURITY GRADING SYSTEMS AND METHODS" having Ser. 62/896,272 filed Sep. 5, 2019, which is incorporated by reference in its entirety.

BACKGROUND

The southeastern states of Georgia, Florida, and Alabama account for two-thirds of the total peanut production in the United States. Optimizing harvest dates is essential for maximizing peanut yields from farms and ensuring top quality peanuts. Currently, the most popular and acceptable method for peanut maturity classification is a manual method called the Peanut Profile Board, which is based on the color of the peanut's mesocarp layer. It is critical to determine the optimal harvest day of peanuts because it directly impacts the yield and grade of the crop. Determining optimal harvest times for greatest yield and value is a time-consuming process typically done by a handful of trained county officials who service a large area of peanut growers. The peanut farmers often have to bring peanut samples to a county office for evaluation, resulting in loss of valuable field time. The process is often based on the personal experience of the evaluator and is thus subjective. In addition, the evaluation, results, and data are not typically stored for later reference.

SUMMARY

In various aspects, peanut grading systems and methods are provided that overcome one or more of the aforementioned deficiencies. The systems and methods can quickly, accurately, and objectively assess peanut maturity as well as project other information, such as optimal harvest dates and peanut prices, based on the assessed peanut maturity.

The present disclosure provides systems, devices, and methods for peanut maturity grading that can be performed in the field and do not require specially trained professionals. The aspects of the system for grading peanut maturity include a peanut grading board, a photo lighting control device, a camera, and one or more computers. The peanut grading board may include an array of peanut placement slots, the peanut grading board configured for placement of a plurality of sample peanuts on/in the slots of the peanut placement array. The photo lighting control device may include a housing and a light source, the housing configured with a base, a top, and walls having an interior surface, where the base has dimensions configured to accommodate the peanut grading board may include an array of peanuts placed thereon, where the top has dimensions configured to accommodate a camera and an opening configured to accommodate a lens of a camera. The system also includes at least one color gradient calibration bar positioned such that said calibration bar is visible within the field of view of the camera. The system also includes a camera configured to capture one or more images of the peanut grading board with the color gradient calibration bar. The system also includes at least one computing device for data communication with the camera, where the at least one computing device is configured to generate a report which may include, but is not limited to, the peanut maturity grade for the plurality of peanuts. The computing device(s) can be configured to perform particular operations or actions by virtue of having software, firmware, hardware, or a combination of them installed on the system for which the operations cause the system to perform the aforementioned actions. One or more computer programs can be configured to perform particular operations or actions by virtue of including instructions that, when executed by a data processing apparatus, cause the apparatus to perform the actions.

The present disclosure also includes, in various embodiments, methods for grading peanut maturity. In embodiments, such methods include using the system for grading peanut maturity of the present disclosure. In embodiments, such methods include at least the following steps: positioning a peanut grading board within the housing of the system for grading peanut maturity, the peanut grading board having sample peanuts from a peanut crop arranged thereon; capturing, via the camera, one or more images of a plurality of sample peanuts on peanut grading board and at least one color gradient calibration bar; analyzing, via at least one computing device, the one or more images captured by the camera, wherein the analyzing includes automatic color calibration, adjusting for any deviations in lighting effects by using the color gradient calibration bar, utilizing image processing for automatically detecting the plurality of peanuts, automatically assigning a peanut maturity grade to each peanut based on at least a peanut type and a peanut color as compared to the color gradient calibration bar, and using predictive methods for automatically determining the maturity of each peanut by sorting into groups, which, when displayed in graphical form, can be used to predict the maturity profile for the peanut crop presented based on the peanut maturity grade distribution for that sample; and generating, via the at least one computing device, a report providing optimized harvest times for the peanut crop based at least on the optimal dig times for the plurality of sample peanuts detected and analyzed.

One general aspect of the present disclosure includes a non-transitory computer-readable computer product may include program code executable in one or more computing devices that. The program code when executed, directs the one or more computing devices to: receive one or more images comprising a plurality of sample peanuts arranged in an array and a color gradient calibration bar; detect the plurality of peanuts from the one or more images; automatically calibrate and adjust for lighting effects using the color gradient calibration bar; analyze the one or more images and independently assign a peanut maturity grade for each of the plurality of peanuts from the one or more images based on at least a peanut type and a peanut color as compared to the color gradient calibration bar; and generate a report comprising the peanut maturity grade for the plurality of peanuts. Other embodiments of this aspect include corresponding computer systems, apparatus, and computer programs recorded on one or more computer storage devices, each configured to perform the actions of the methods.

Other systems, methods, devices, features, and advantages of the devices and methods will be or become apparent to one with skill in the art upon examination of the following drawings and detailed description. It is intended that all such additional systems, methods, devices, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The patent or application file contains at least one drawing executed in color. Copies of this patent or patent application with color drawing(s) will be provided by the Office upon request and payment of the necessary fee The components in the drawings are not necessarily to scale, with emphasis instead being placed upon clearly illustrating the principles of the disclosure. Moreover, in the drawings, like reference numerals designate corresponding parts throughout the several views.

FIG. 6A is a digital image depicting an embodiment of the card, and FIG. 6B is an image depicting sample peanuts arranged on the embodiment of the peanut grading calibration card from FIG. 6A.

FIG. 7A is a digital image depicting an embodiment of a 3D peanut grading calibration card of the present disclosure featuring well-shaped peanut placement markers, and FIG. 7B is a digital image depicting sample peanuts arranged in the wells of the embodiment of the 3D peanut grading calibration card of FIG. 7A.

FIGS. 23A-23C illustrate comparison between the PMDA and human graders in calculating the percentage of black brown peanuts (FIG. 23A), the percentage of black peanuts (FIG. 23B), and the total number of peanuts (FIG. 23C) for example 2.

DETAILED DESCRIPTION

Figure 1:
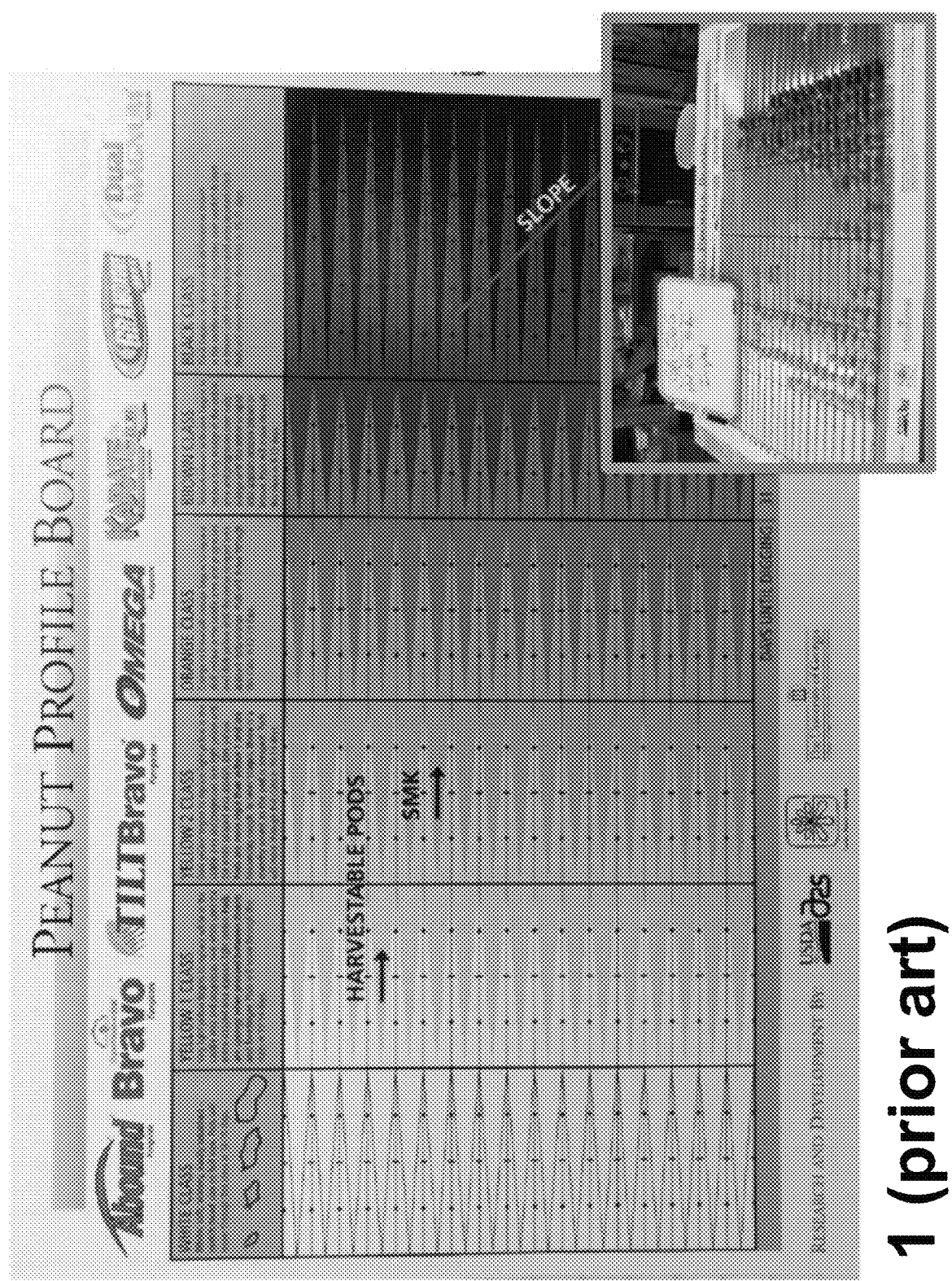
FIG. 1 is an example of a known method of manual peanut maturation grading using a peanut profile board with color grading and the hull scrape method.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Embodiments of the present disclosure will employ, unless otherwise indicated, techniques of agriculture, botany, computer science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Although any methods and materials similar or equivalent to those described herein can also be used in the practice or testing of the present disclosure, the preferred methods and materials are now described. Functions or constructions well-known in the art may not be described in detail for brevity and/or clarity.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of".

In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

As used herein, "about," "approximately," "substantially," and the like, when used in connection with a numerical variable, can generally refers to the value of the variable and to all values of the variable that are within the experimental error (e.g., within the 95% confidence interval for the mean) or within +1-10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" indicates that the subsequently described event or circumstance can or cannot occur, and that the description includes instances where said event or circumstance occurs and instances where it does not.

Description

In various aspects, the present disclosure relates to various systems and methods for facilitating the determination and grading of the maturity of crops of peanuts to help estimate preferred harvest times for optimizing crop yields and profits. The systems and methods of the present disclosure provide advantages over traditional grading methods which cannot be done in the field and require significant input of time and analysis by one or more individuals (farmer, county official, etc.). The systems and methods of the present disclosure provide a mobile and more automated approach that allows for quick and efficient peanut maturity grading and harvest time estimation in the field.

The peanut is an important crop that has an annual global production of 29 million tons. In the United States, the southeastern states of Georgia, Florida, and Alabama account for two-thirds of the country's total production. Determining the optimum harvest maturity is of paramount importance because it directly impacts the yield and grade of the peanuts. Inaccurate assessment of peanut maturity could potentially result in large economic losses, not just to the growers but to the peanut-related industry as a whole.

The conventional method of determining peanut maturity is called the peanut maturity board method. Williams and Drexler (1981) pioneered the field by designing a peanut maturity profile board based on research outcomes from many studies. The peanut profile board (FIG. 1) uses the close relationship between the pod mesocarp color and pod maturity to predict optimal harvest days. County agents initially collect peanut samples from the most representative locations of the fields. The agents then placed each peanut one by one into different color regions on a peanut profile board. The digging day for the peanuts can be estimated based on the percentage of black peanuts present in the sample. This method has some limitations, such as long processing times and discrepancies in the maturity results from one agent to another.

A major drawback of the Peanut Profile Board method is that the results can vary greatly between different human sorters since the colors of the mesocarps are subjectively evaluated. Designing software and hardware to standardize this method could potentially reduce the variation of results and improve reliability. To develop the design criteria, the categorization process must be better understood. To overcome the aforementioned limitations, various examples of a semi-automated system was developed to achieve comparable performance to human graders and act as a data logging platform for user and harvest information.

The present disclosure provides an easy-to-use tool for peanut growers that helps them optimize the date of harvest and maximize crop value. Research by Kvien (http://www/gapeanuts.com/growerinfo/research/2016reports/2016_gperesearch_kvien_hullscrapemethod.pdf) has demonstrated that optimizing the harvest date yields a measurable increase in crop value; likewise, harvesting too early results in a significant drop in the peanut grade and a drop in the crop value per acre. The currently employed method for determining peanut maturity and prospective harvest dates is called the hull scrape method, which is performed manually by a trained individual. A simple, portable, smartphone application could reduce the subjectivity associated with the hull scrape method, increase accuracy of color determination, facilitate the use of additional data, and improve the choice of harvest date, thus increasing crop value.

According to various embodiments of the present disclosure, a user (e.g., farmer, farm worker, crop scientist, etc.) of the system/methods of the present disclosure can easily and efficiently determine the maturity of multiple peanut crops and estimate the optimal harvest time for the crops as well as obtain valuable projected yield and financial data. According to various embodiments of the present disclosure, a trained deep-learning convolutional neural network (DL-CNN) can be used to distinguish, identify, and analyze peanut color and maturity using images obtained from a camera and can also calculate and determine additional output such as optimized dig dates for sampled peanuts and optimized harvest dates for the crop. The identification and color grading of sampled peanuts and other entered data can be transmitted to a remote database for further analysis and calculation of an optimized harvest date for a sampled peanut crop as well as projected crop yield and financial data. In various embodiments, data (both data obtained from peanut images on a user computing device, additional user-provided/input data, and additional data available from remote databases) can be transmitted via a network to a remote mapping program in real time.

Figure 2:
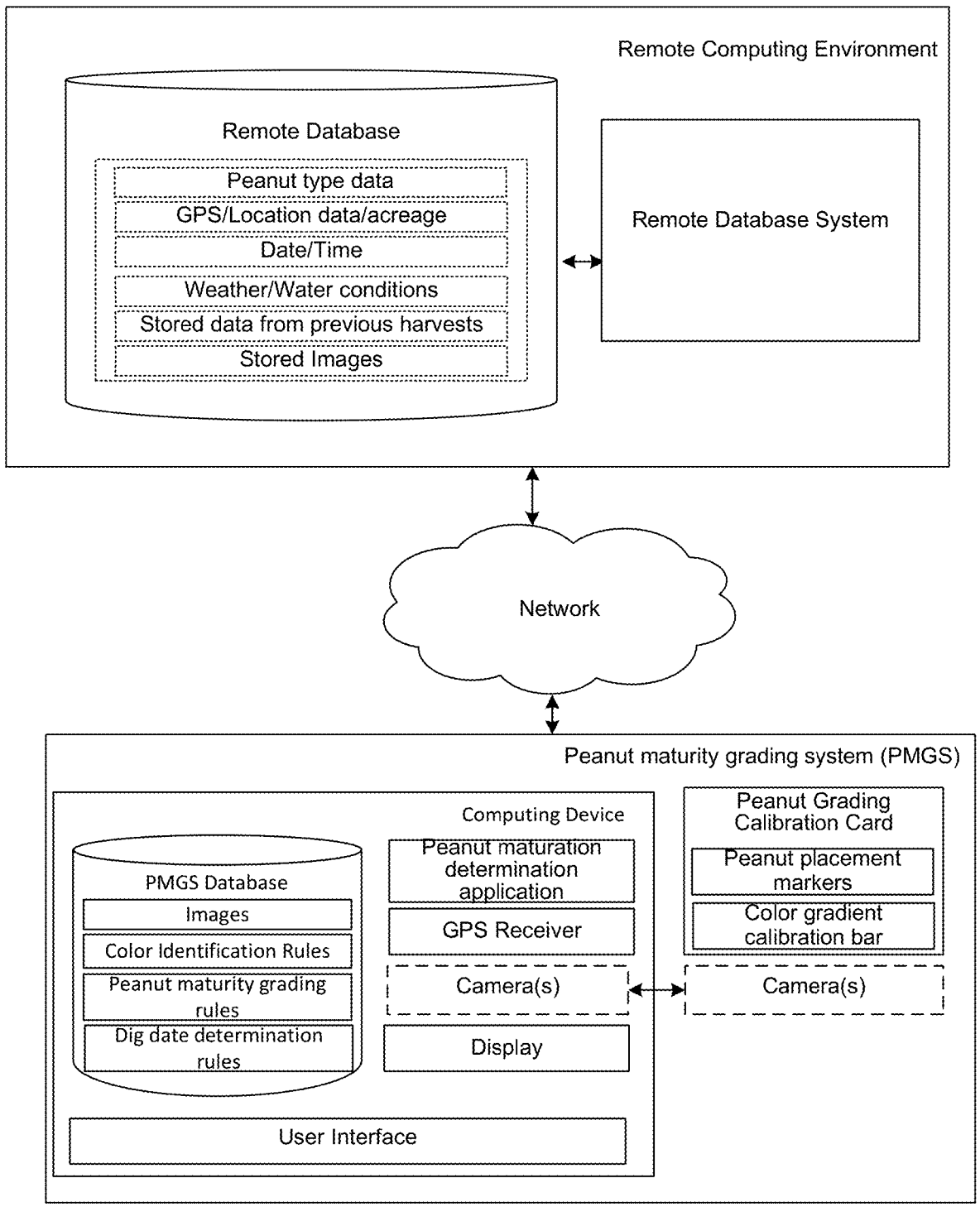
FIG. 2 is a schematic block diagram of a networked environment according to various embodiments of the present disclosure.

Turning to FIG. 2, shown is an example of a networked environment associated with an automated peanut maturity grading system (PMGS) according to various embodiments of the present disclosure. The networked environment includes a remote computing environment and a peanut maturity grading system (PMGS) in data communication via a network. As shown in FIG. 2, the PMGS includes a peanut grading calibration card, one or more cameras, at least one computing device and a peanut maturation determination application (PMDA) executable on the at least one computing device. The at least one computing device can include a mobile device or smartphone. The network includes, for example, the Internet, intranets, extranets, wide area networks (WANs), local area networks (LANs), wired networks, wireless networks, cable networks, satellite networks, or other suitable networks, etc., or any combination of two or more such networks.

The remote computing environment may comprise, for example, a computing device or any other system providing computing capability. Alternatively, the remote computing environment may employ a plurality of computing devices that may be arranged, for example, in one or more server banks or computer banks or other arrangements. Such computing devices may be located in a single installation or may be distributed among many different geographical locations. For example, the remote computing environment may include a number of computing devices that together comprise a hosted computing resource, a grid computing resource, and/or any other distributed computing arrangement. In some cases, the remote computing environment may correspond to an elastic computing resource where the allotted capacity of processing, network, storage, or other computing-related resources varies over time.

Various applications and/or other functionality may be executed in the remote computing environment according to various embodiments. Also, various data is stored in the remote database that is accessible to the remote computing environment. The remote data store may be representative of a plurality of data stores as can be appreciated. The data stored in the remote database, for example, is associated with the collection of peanut identification and grading information obtained by the PMGS. The data stored in the remote database (e.g. web or cloud database) can also include other data entered by a user (specific peanut type, crop location, water conditions, the peanut size, weight, aroma, disease, etc.), generally accessible data (e.g., GPS data, weather conditions, historical data, etc.). For example, water, soil and weather conditions could be obtained through human data input during grading or national weather/USDA reports. The data stored in the remote database can further be associated with the operation of the various applications and/or functional entities described below.

The components executed on the remote computing environment, for example, include the remote database system, and other applications, services, processes, systems, engines, or functionality not discussed in detail herein. The remote database system is executed to receive identification data from the PMGS and store it in the remote database. According to some embodiments, the remote database system can further be executed to train, retrain, and/or refine machine learning models using the various captured images. The remote database system can further be executed to retrieve data from the remote data store and transmit to additional computing devices for review. The data stored in the remote database can be used to determine optimized harvest dates for specific crops and ultimately projected crop yield data and even financial data (e.g., profit and loss data, projected peanut prices, etc.).

The data in the data store includes, for example, peanut data and potentially other data. Peanut data includes information on type of peanut crop, location data (e.g., GPS location, acreage, etc.), date/time, weather and/or water conditions, stored data from previous harvests, images, and/or other peanut data as applicable. In embodiments, location information corresponds to the exact latitude and longitude where a specific peanut crop resides. For this purpose, the PMGS may include a global positioning system (GPS) receiver and/or other positioning device. When activated the PMGS GPS receiver can determine the location of the crops. This information can then be transmitted to the remote database (in real-time or near real-time) for storage and further reference as can be appreciated.

Date/time information includes the date/time associated with the sampling of peanuts from a crop to be analyzed. The peanut type data corresponds to the species/variety of peanut plant and any other information specific to the peanut plant. The weather conditions can correspond to the historical weather conditions in the crop location during the growing season, or the predicted weather through the projected harvest dates. Water conditions can correspond to the watering/irrigation schedule used for the crops during the growing season. Stored data from previous harvests can include various information from previous harvests, such as crop yield, weather data from previous years, peanut maturity grading information from previous harvests, etc. The stored images may include those associated peanut color grading, maturity grading, as well as historical images and current images for analysis. Images can be used in retraining and/or refining the machine learning models implemented by the PMGS computing device and/or any other computing device as can be appreciated.

Figure 7A:
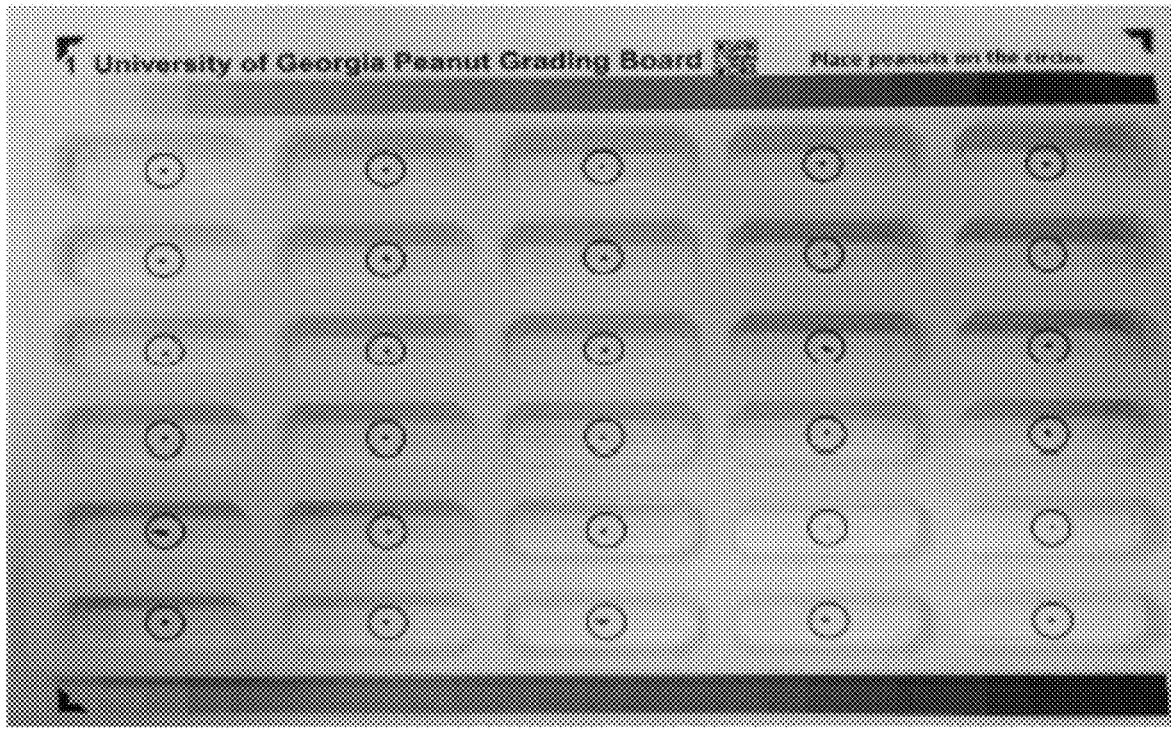
FIGS. 7A-7B illustrate an embodiment of a 3D peanut grading calibration card of the present disclosure with and without peanuts.
Figure 7B:
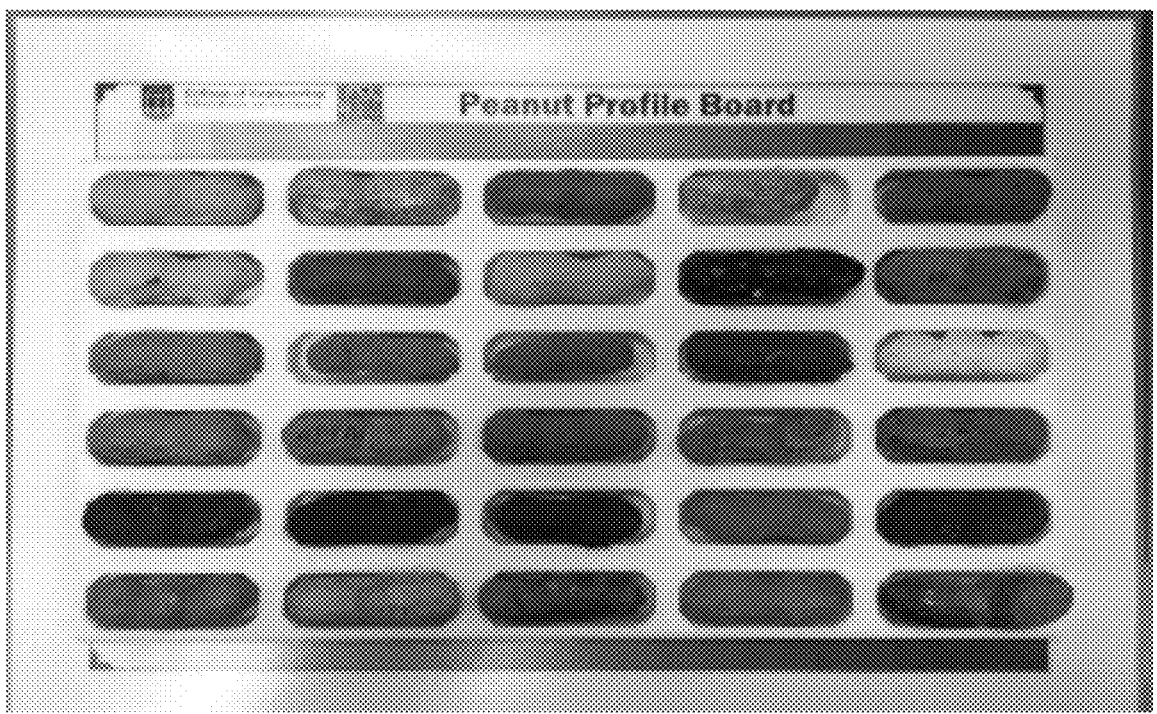

The PMGS includes at least a peanut grading calibration card, such as illustrated in FIGS. 6A-6B and FIGS. 7A and 7B. In embodiments, the peanut grading calibration card includes an array of peanut placement markers to assist a user in placement of sample peanuts (e.g., peanuts sampled from a crop for maturity analysis) on the calibration card. In an embodiment illustrated in FIG. 6A, the card is a flat substrate and the peanut placement markers can include an arrangement of markings (circles are illustrated, but the markings could be dots, squares, stars, any other symbol or marking to designate placement) to generally indicate the location for placement of a peanut on the marking on the card. However, in other embodiments, such as illustrated in FIG. 7A, FIG. 9, and FIGS. 12A-12C the peanut placement card and/or markers may include a three dimensional shape, or depression to accommodate all or part of the peanut (e.g., an elongated well formed in the card in which a peanut can be placed as shown in FIG. 7B). This "well" can be altered in shape to allow for curvature that best fits the peanut type being sampled, so as to allow them to settle into the center of each slot in their proper alignment. This 3D card/board can have various configurations, an embodiment of which is shown in FIGS. 7A and 7B, and different varieties possess various advantages and disadvantages. In embodiments of a 3D peanut grading calibration card, the card is a three dimensional substrate and the peanut placement markers are elongated wells configured to receive a peanut such that peanuts can be placed in the wells. For example, a well with through-holes can allow smaller peanuts to be filtered out, keeping only those of the desired minimum size. In another embodiment, the peanut placement card can be a flat or 3D substrate having through-holes for placement of the peanuts (e.g., FIGS. 12A-12C), where the through-holes are shaped to hold the peanuts, but peanuts that are too small can be filtered out.

Figure 12A:
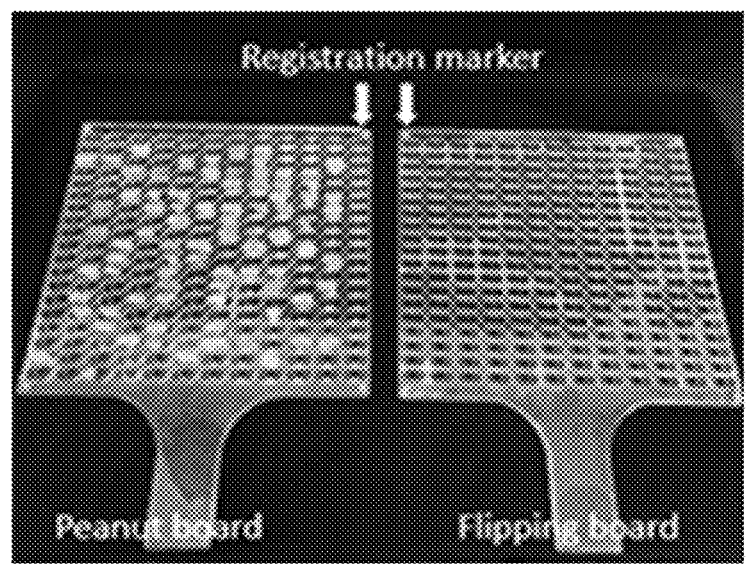
FIGS. 12A-12C illustrate the peanut grading board with optional flipping board: peanut samples were allocated on slots with a fixed distance apart from each other (FIG. 12A), a flip board to scan the rear side of the peanuts (FIG. 12B), and the peanut samples flipped with the rear side facing upward (FIG. 12C).
Figure 12B:
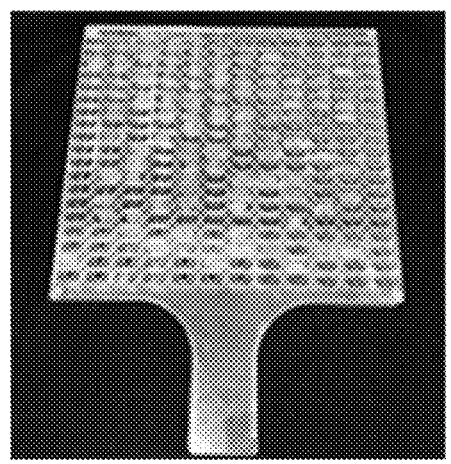
Figure 12C:
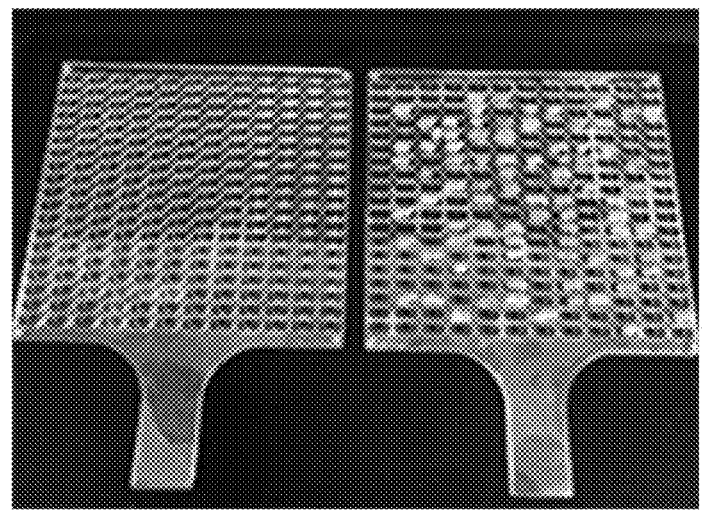

In embodiments a second peanut placement card can be used to interface with the first peanut placement card to allow for easy "flipping" of the peanuts, so that the other side of the peanuts can also be analyzed without having to flip each peanut individually (see FIGS. 12A-12C). An advantage to the systems of the present disclosure, among those described above, is also that the peanuts can be placed randomly on the board and do not need to be manually pre-sorted or arranged or ordered with respect to color or other quality. Additional embodiments and implementations can incorporate mechanical sorting and further optimizations in automation, including but not limited to shaking the board, having a station with a mounted camera, and robotic instrumentation to collect the samples and process them with minimal human interaction.

In embodiments, such as illustrated in FIGS. 6A, 6B, 7A, and 7B, the peanut grading calibration card can also include corner or field-of-view markers or indicators, to assist in aligning the field-of view of the camera with the peanut grading calibration card to obtain an image in which the full view of the peanut grading calibration card is captured.

In embodiments, the peanut grading calibration card also includes at least one color gradient calibration bar. In the embodiments illustrated in FIGS. 6A-6B and 7A-7B, the calibration cards each include two color gradient calibration bars on the top and bottom of the cars. The color gradient calibration bar includes a color gradient of colors associated with peanut hulls at different stages of maturity and assists with assigning a color grade to each peanut and to calibrating the image analysis function to minimize lighting effects in the obtained images. The color gradient bar is visible in the embodiments of the calibration cards illustrated in FIGS. 6A-6B and 7A-7B. Color grading according to the color gradient bar is illustrated in FIG. 8.

Figure 8:
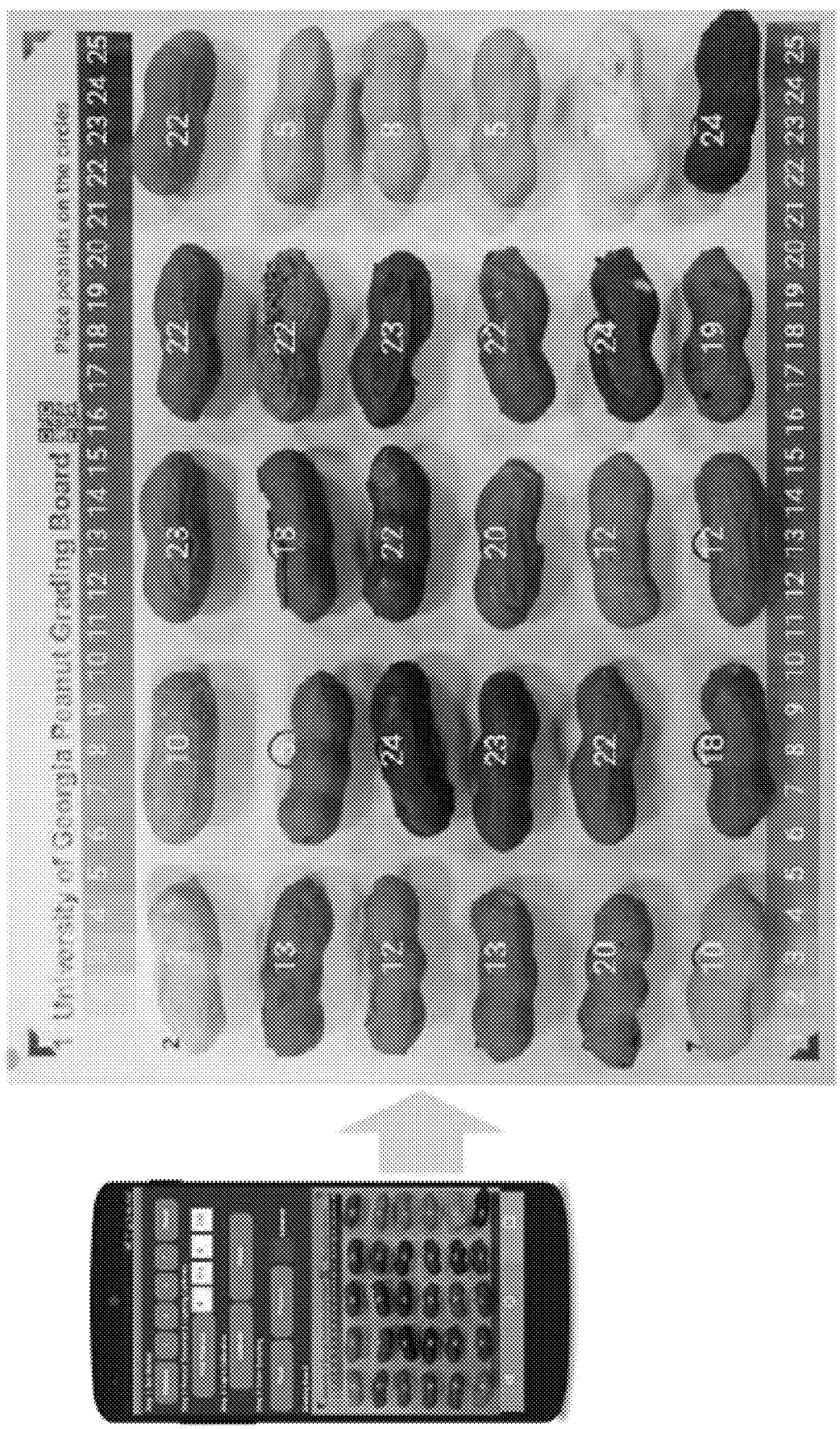
FIG. 8 illustrates color grading of the sample peanuts according to the color gradient bar.

In an example, a color gradient calibration bar with twenty-five gradient colors, as shown in FIG. 8, was extracted from the traditional peanut profile board (FIG. 1) to set the color distribution in the peanut maturity classification procedure further. In this example, the RGB (Red, Green, Blue) value of each color in the color bar was determined by calculating the RGB value of the field of view in each column, which was extracted from the source file of the peanut profile board. In an example, each color in the color bar was assigned a number from 1 to 25 to represent the color gradient from white to yellow, orange, brown, and black.

Figure 10C:
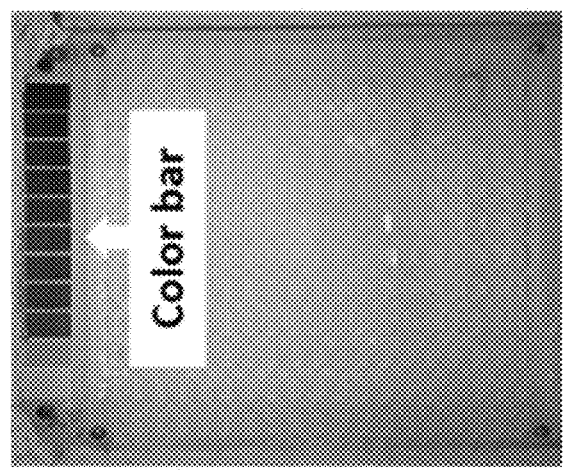
FIGS. 10A-10C illustrate the photo lighting control device for scanning peanuts.

In embodiments, such as illustrated FIG. 10C, the color gradient calibration bar can be provided separately to the peanut grading calibration card, but can be used with the peanut grading calibration card (e.g., being placed near the peanut card when the image is taken so that it can also be in the same field of view of the camera, such that both the peanuts on the card and the color gradient calibration bar are in the picture taken by the camera). For example, the color calibration bar can be included in a photo lighting control device (e.g., a "photobooth") as illustrated in the photographs shown in FIGS. 10A-10C.

Peanuts could appear to have different colors under different lighting conditions. To ensure optimal performance of the smartphone application, creating a closed, controllable and uniform lighting environment can provide an improved condition for accurate image capture and analysis. In this context, a photo lighting control device to provide controlled conditions for image capture for grading peanut maturity.

In embodiments, the PMGS can also include a photo lighting control device (also referred to as a "photobooth" herein) to help control lighting conditions of the pictures of the peanuts on the peanut grading calibration card. In embodiments the photobooth has a larger base, with dimensions to accommodate the peanut grading calibration card, and a smaller top, with dimensions to accommodate a smartphone with an aperture/opening at the top to allow viewing via a viewfinder of a smartphone camera. In embodiments, the photobooth also includes a light source and may be lined on the interior with a reflective material for improved lighting. In embodiments, a color calibration bar may be included in the interior of the photobooth for color calibration with peanuts on the peanut grading calibration card (the peanut grading calibration card may or may not include a color calibration card). Other variations of the picture lighting control device can be envisioned and are intended to be included within the scope of the present disclosure.

Figure 9:
FIG. 9 illustrates a data logging system including a photo lighting control device (left) and peanut grading board (right) configured capture images to store and upload peanut data.

Shown in FIG. 9 is a system for grading peanut maturity. The system for grading peanut maturity includes a photo lighting control device, a peanut grading board, and a camera. In embodiments, the system includes the photo lighting control device and peanut grading board and does not include the camera but is adapted to be used with a camera supplied by a user. In an embodiment, the peanut grading board (also referred to as "peanut board" herein) can be the same peanut grading calibration card shown in FIGS. 6A and 7A or a solid board with recesses or slots as shown in FIGS. 9 and 12A-12C. The peanut grading board can be configured with a handle to facilitate insertion and removal of the peanut grading board into the photo lighting control device. In an embodiment, a peanut grading calibration card that is substantially flat or made of thin material can be used with a tray, a paddle, or other substrate to facilitate insertion into the photo lighting control device.

The photo lighting control device comprises a housing configured with a base, a top, and walls having an interior surface. The housing is also configured with light source. The housing can have box-like shape, truncated pyramid shape, or other shape configured to provide controlled lighting of the interior of the housing. The housing can include one or more handles on the exterior for portability.

The base can have dimensions configured to accommodate the peanut grading calibration card comprising an array of sample peanuts placed thereon. The housing can have an opening on a side at the base configured to receive the peanut grading calibration card comprising an array of sample peanuts placed thereon. For example, the opening can be at least the thickness of the peanut board with peanuts thereon with a clearance. In some examples, the base can also include a color gradient calibration bar installed at the base in the interior of the housing, facing the top of the housing. In some examples, the base can include a pair of moving rails to facilitate sliding of the peanut grading calibration card into the lighting control device.

The top of the housing can have dimensions configured to accommodate a camera and an opening configured to accommodate a lens of a camera. For example, the camera can be a digital camera, a smartphone with a camera, and the like. The opening can be configured to position at least the lens of the camera such that the field of view of a captured image includes the sample peanuts placed on the peanut grading calibration card and a calibration strip at the base of the lighting calibration device. In some examples, the opening can be adjustable to minimize the amount of light entering the interior of the housing from an exterior source. In some examples, the top can also include a holder for the camera. The top of the housing can be sized such that the entire peanut grading board and the color gradient calibration bar is in the field of view of the camera. In some embodiments, the peanut grading board comprises the color gradient calibration bar. In some embodiments, the color gradient calibration bar can be positioned and/or affixed to the base of the housing of the photo lighting control device.

The interior surface of the housing optionally comprises a reflective material. An optional light source can be positioned on at least one wall of the housing. In some embodiments, the light source is positioned in a through hole formed in the wall of the housing. In some embodiments, a recess is formed in the wall to accommodate the light source. The light source is configured to illuminate the interior of the photo lighting control device such that consistent lighting is provided to the sample peanuts on the peanut grading calibration card. The light bulbs for the light source can be selected to provide natural light. In some embodiments, the light source is positioned within the interior of the housing. For example, LED light strips can be positioned to cover the entire interior wall surface of the housing. Optionally, at least one wall can comprise a reflective material on the interior surface for at least a portion of. The geometry of the photo lighting control device is configured to optimize the light input to the camera.

Figure 10B:
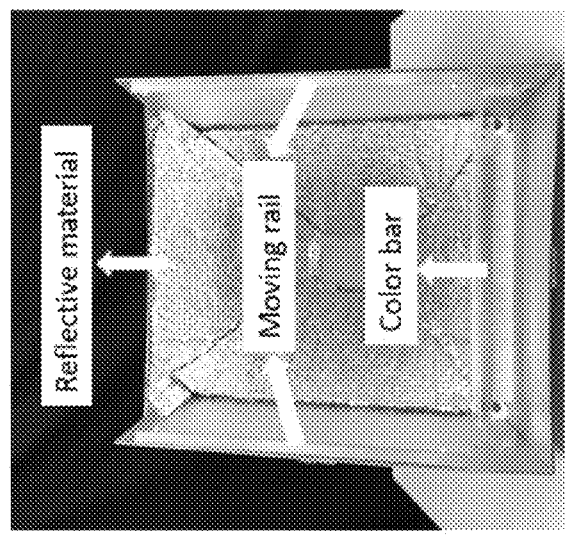
Figure 10A:
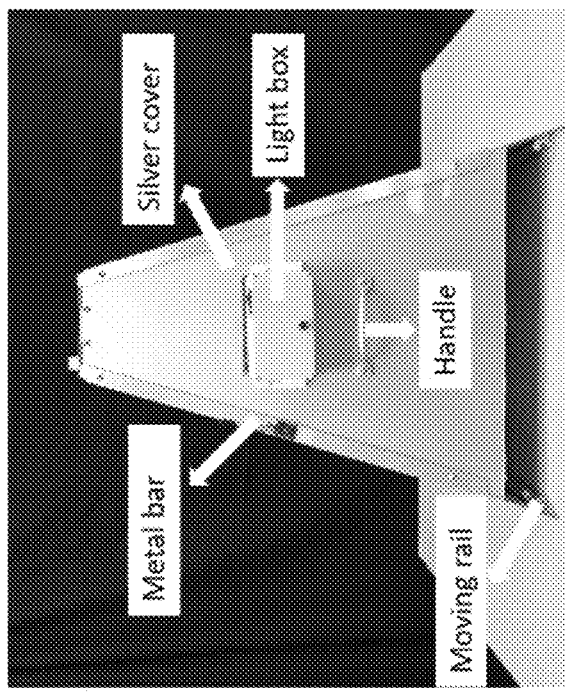

In one example, the photo lighting control device as shown in FIGS. 10A-10C can maintain constant lighting conditions and ensure consistent color scanning results. In embodiments, the housing can be 420 mm×470 mm at the base to accommodate a peanut grading calibration card with an area of 372 mm×400 mm with a thickness of 8 mm. The height from the base to the top of the housing can be 560 mm. As shown in FIG. 10A, the housing can have a truncated pyramid configured to distribute the light evenly within the interior of the housing. As shown in FIG. 10B, viewed from the bottom of the photo lighting control device, the interior surface of the housing can include reflective material. Moving rails positioned on at least two walls of the housing at the base can be configured to receive the peanut board. A color gradient bar can be attached at the base opposite the opening, such that when a peanut board is received within the photo lighting control device, the peanut board is positioned next to the color gradient bar, as shown in FIG. 10O, viewed from the top of the photo lighting control device.

Figure 11:
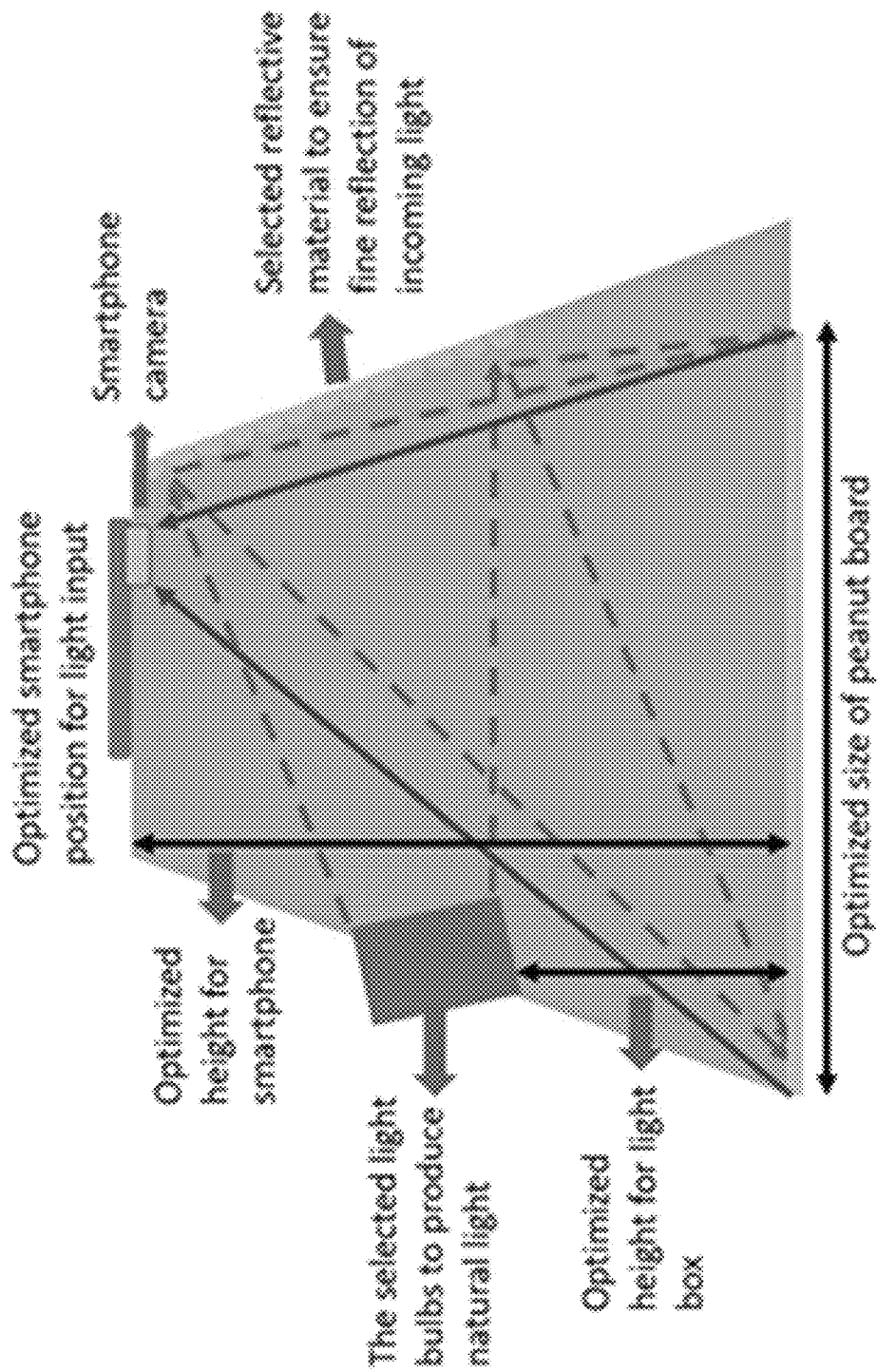
FIG. 11 illustrates the photo lighting control device design for consistent lighting conditions.

FIG. 11 illustrates an example of relative dimensions of a photo lighting control device to produce constant light intensity but also creates uniformly scattered light. The base can be optimized to receive the peanut board. The base can also have a portion to include the color gradient bar. The light source can be positioned on a wall of the housing and directed such that the light reflects off a reflective surface of the opposite housing wall, which can optionally include a reflective material to ensure fine reflection of incoming light. The light source can include light bulbs that provide natural light. The height of the housing can be configured for the camera to view the entire peanut board and color gradient bar.

A peanut grading board can comprise an array of peanut placement markers to position the sample peanuts for imaging using the photo lighting control device. The peanut grading board can be configured for placement of a plurality of sample peanuts on/in the markers of the peanut placement array. The peanut grading board can be substantially flat with recesses or slots in the peanut placement array configured to hold the sample peanuts. For example, the array can be 12×19, but the dimension can vary. The peanut board can be configured to hold a sample size that would reasonably fit in the field of view of the camera withing the housing. In one example, the peanut board can hold up to 209 peanuts. In one example, the peanut board can hold up to 425 peanuts. The slots on the peanut board allow the alignment of peanut samples for imaging. One or more registration markers can be installed for registration between the board and the smartphone camera. For example, as shown in (FIG. 12A) the red registrations markers are at the corners of the peanut board. In the example shown, the peanut grading boards were built with transparent acrylic sheets. The transparent acrylic material can minimize the background interference while color scanning. As can be understood, this is a non-limiting example and other materials can be used for the peanut board. In some embodiments, the peanut grading board is made of transparent or translucent material configured to us in conjunction with a traditional peanut profile board underneath to aid in the distribution of the peanut sample. In some embodiments, an array of drain holes can be created with one or more holes the bottom of each peanut board so that the boards can be repeatedly washed and reused.

Optionally, the peanut sample could be scanned on both sides using a flipping board embodiment. As shown in FIGS. 12A-12C, the flipping board can be a second peanut grading board or substantially the same as the peanut grading board. The flipping board can be configured to mate with the peanut grading board having a mirrored configuration to sandwich the peanut samples between the peanut grading board and the flipping board. As shown in (FIG. 12B), with the peanut grading board placed on a flat surface, the flipping board can be placed on top of the peanut grading board to hold the peanut sample in place as rotated or flipped. Once the flipping board is on the flat surface, the peanut grading board can be removed and the opposite side of the peanut sample can be scanned as shown in FIG. 10O. As shown in FIGS. 12A and 12C, the peanut sample is transferred from the first peanut grading board to the second peanut grading board, maintaining the position of the peanuts and allowing a first and second side of the individual peanuts to be imaged.

In an embodiment, a motorized design can be configured for an automated system. The peanut grading board can comprise a first and second peanut grading board. The peanut sample can be placed on the first peanut grading board and the second peanut grading board can hold the peanut sample in place as a flipping board. The motorized design can flip the peanut grading board within the system to allow imaging on both sides, as such, no manual work is required to withdraw, flip and reinsert the peanut board after an image is captured of the first side.

In another embodiment, the system for grading peanut maturity can be configured with two separate camera positions to capture images of both sides of the peanut sample without the need a user to withdraw, flip and reinsert the peanut board after an image is captured of the first side. A first camera can be positioned at the top of the photo lighting control device to capture an image of a first side of the peanut sample on the peanut grading board and a second camera can be mounted beneath the peanut grading board to capture an image of a second side of the peanut sample. Alternatively, the first camera can be moved after capturing an image of the first side of the peanut sample and can then be moved to the second location beneath the peanut grading board to capture the image of the second side of the peanut sample. By using a transparent material for the peanut grading board, the second side can be viewed through the transparent material to capture the image without the need to flip the board over for the second image. The system for grading peanut maturity can be configured such that the photo lighting control device is extended to have controlled illumination for the second side of the peanut grading board. In an embodiment, the portion of the photo lighting control device beneath the peanut grading board can be substantially the same as the portion above the peanut grading board having separate light sources in each portion. The system using top and bottom camera positions can be used to obtain more accurate readings of calibrated RGB values. It can allow both sides to be scanned. Having different cameras, or different camera positions, as image capture systems can allow for better precision as well, depending on the light source and assuming a camera of equal or better specs.

In another embodiment, the system for grading peanut maturity can be configured with a mirror at the base of the photo lighting control device such that images can be captured on the both sides of the peanut grading board using one camera, without the need to flip the peanut grading board. The second camera/camera position beneath the peanut grading board can be replaced with an array of mirrors that (work like a periscope) and provide an optical pathway for reflecting the bottom image of the peanut board to the top camera.

As shown in FIG. 9, the system for grading peanut maturity can be used to log and grade the peanut sample. The individual peanuts of the peanut sample can be placed on the peanut grading board. The board can be inserted into a photo lighting control device to be illuminated in a controlled environment. The camera can be used to image the peanut sample. The system for grading peanut maturity also comprises a data logging program for saving information about the peanut sample, grading the sample, and generating reports. The data logging program can be implemented on one or more computers, utilize user input data, and databases from external sources.

For example, each peanut of the peanut sample can be classified into a corresponding color value of the color bar, as shown in FIG. 100, based on the nearest-neighbor method. In order to reduce the effect of the lighting condition, HSV (Hue, Saturation, Value) color domain can be used instead of RGB (Red, Green, Blue) domain. The color of each peanut pod can be estimated based on the average HSV (Hue, Saturation and Value) value within a rectangular field of view that covered the peanut pod. In HSV, the saturation and value are between 0 and 1, the hue is from 0 to 360, so the saturation and value are extended to 0 to 100 in algorithm in order to make the value of HSV more balanced for nearest-neighbor calculation. In addition, the saturation and value are related to the lighting condition, so they are given a small weight in the distance calculation of nearest-neighbor method in order to reduce the effect of lighting condition on classification results.

Figures 13A, 13B, 13C, 13D:
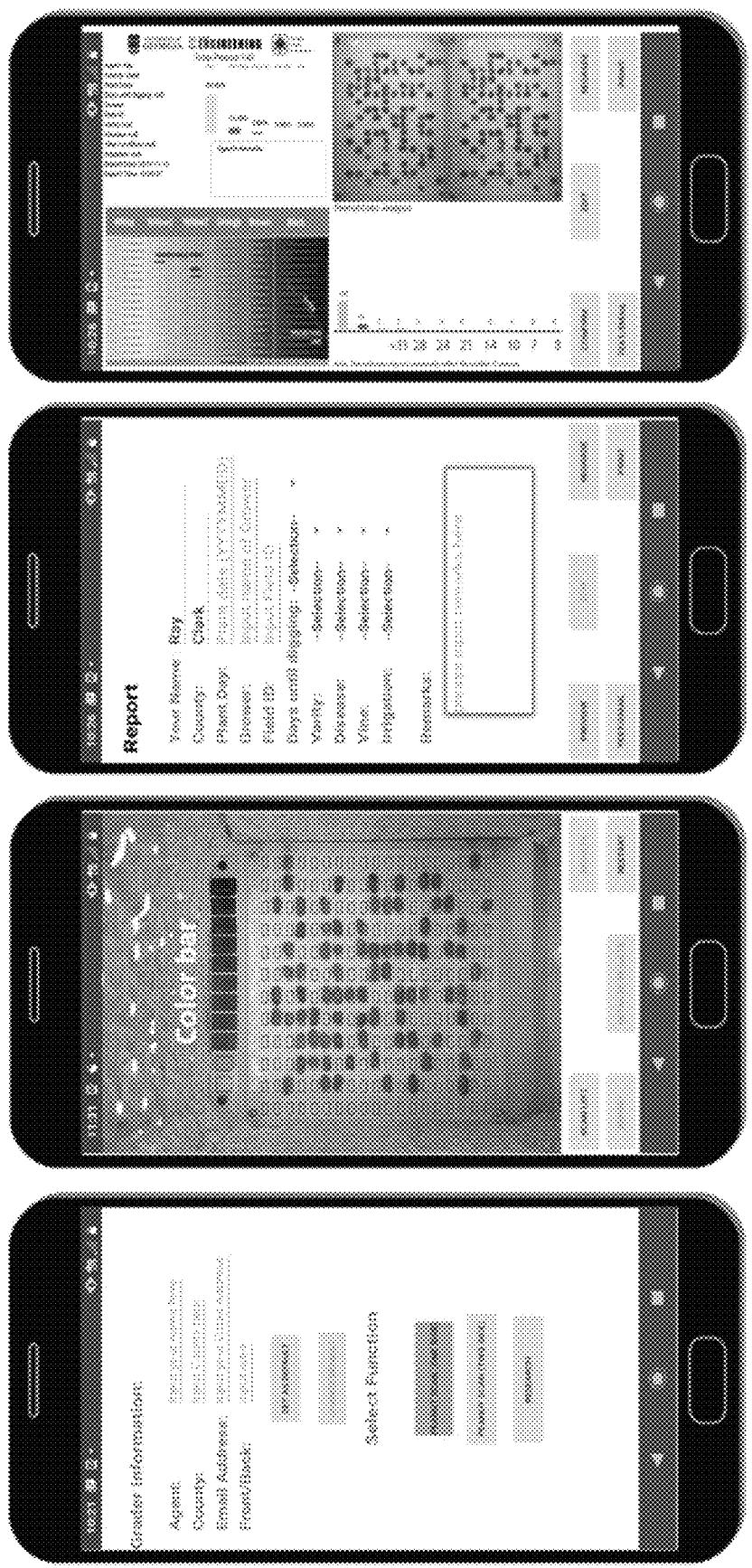
FIGS. 13A-13D illustrate an example of a user interface for the peanut maturation determination application (PMDA) with user input screen (FIG. 13A), alignment (FIG. 13B), report data selection (FIG. 13C), and sample report (FIG. 13D).
Figure 24B:
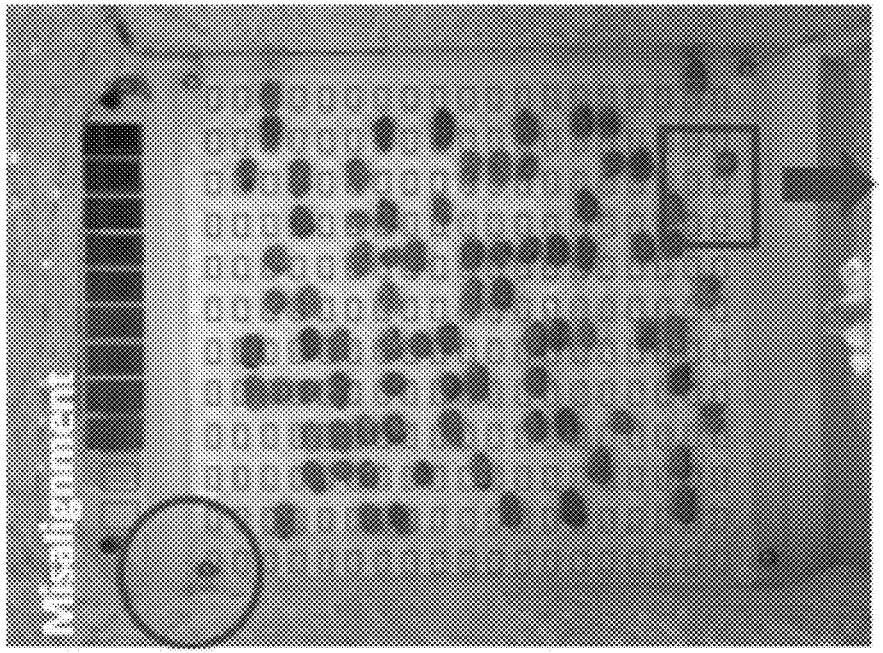
FIGS. 24A-24B illustrate correct registration result due to good positioning of the scanning squares on the board (FIG. 24A) and incorrect registration will include the background color and increase the errors of color scanning (FIG. 24B) for example 2.
Figure 24A:
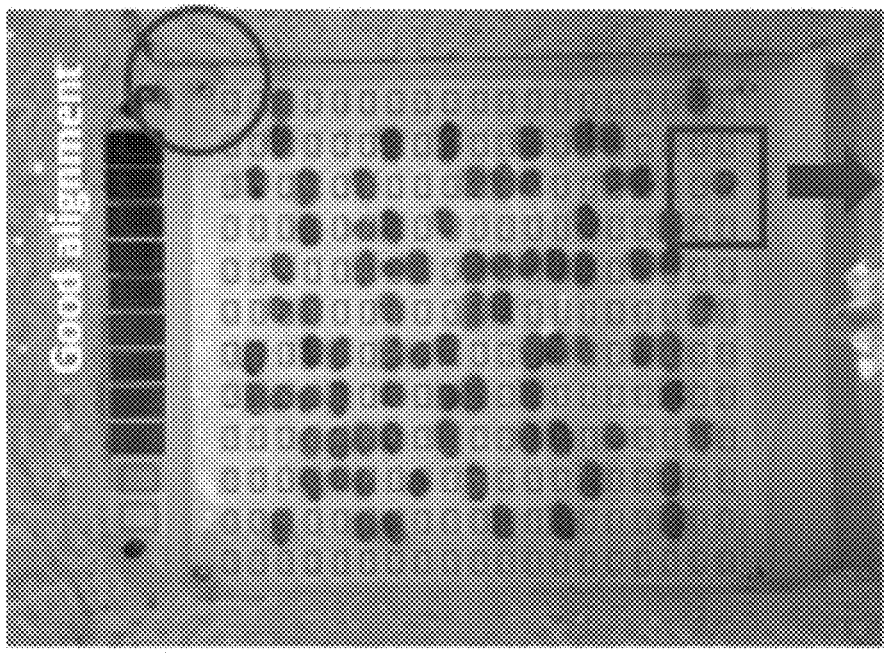

In an example, a smartphone can be used as the camera to obtain images and a user interface for the PMDA described herein. The users can follow the instructions on the smartphone to take a picture of a peanut sample, analyze the sample color and generate reports of color distribution (FIG. 13A-13D). For example, the user interface for the PMDA can include a user input (FIG. 13A), alignment (FIG. 13B), report data selection (FIG. 13C), and reporting (FIG. 13D). In an embodiment, the user can also input other information, such as vine condition, disease condition, related to the peanut samples. The data and reports can be stored in a memory on one or more computing devices and accessible via a user interface. The report can be generated to display in the user interface and/or printed. In some embodiments, the user interface can be a smartphone. In some embodiments, the PDMA can have three different bodes for different purposes: scan two sides of peanut, scan one side of peanut, and research. After the mode is selected, a red grid is appeared for registration between the camera of smartphone and sorting board (FIGS. 24A and 24B). Once registration has been done, users can follow the instructions on the smartphone to take photos and finish the classification. In an embodiment, the classification results can be checked with two different ways: one is with the percentage of yellow, orange, brown, black peanuts, another one is with the peanut number in each color bar.

The generated report can be printed out using a wireless-connected printer or shared through emails and text messages. All the reports were uploaded to a remote database. Reports can include information to classify the tested sample, such as logger name (user), county (location), plant day, grower, field ID, days until digging, variety of peanut, disease, irrigation, and remarks. Additional relevant information can also be included from external or public databases. In an embodiment, the data collected in images and via the user interface can be sent to a remote database with a timestamp automatically for research and prediction.

Figure 14:
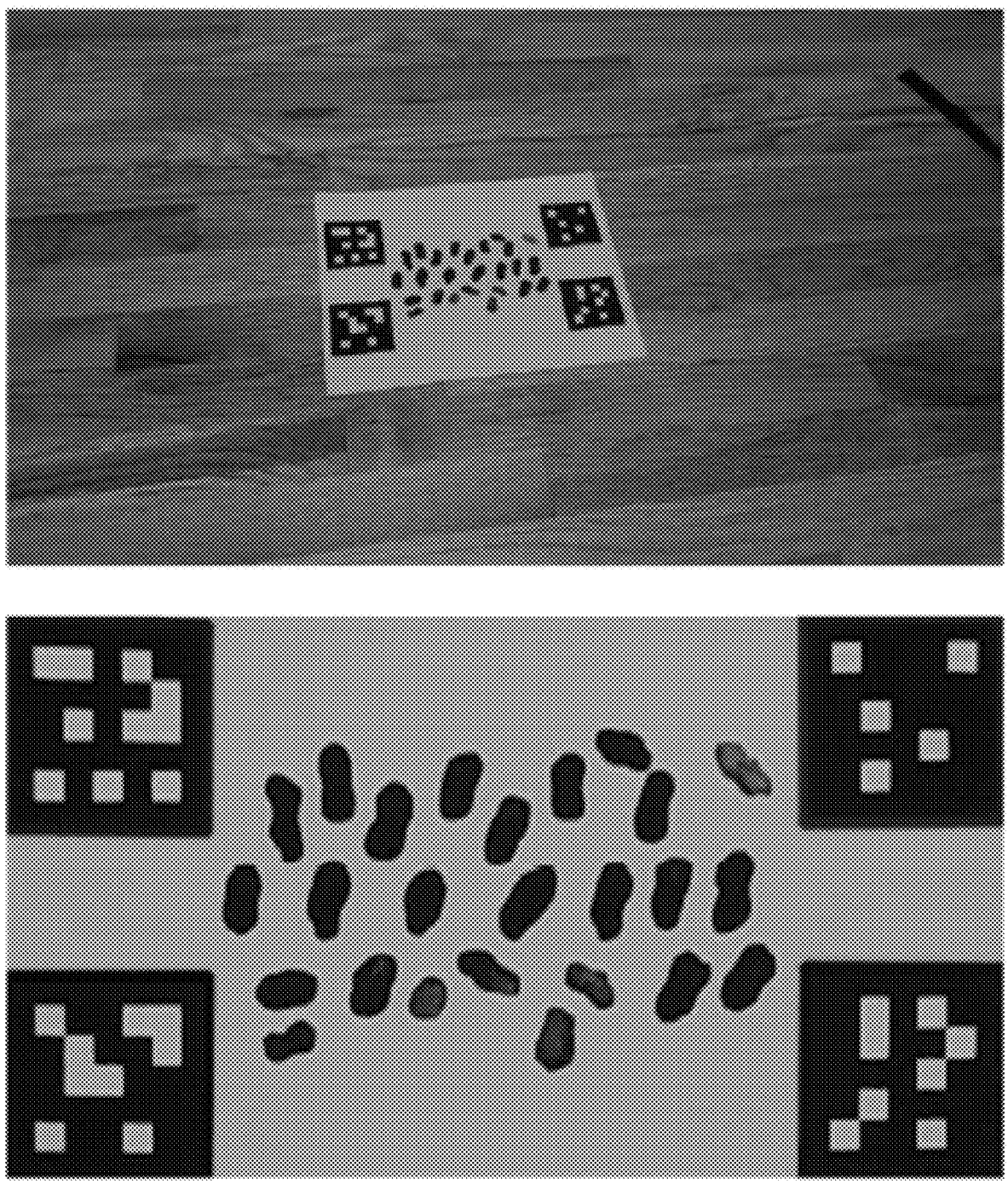
FIG. 14 illustrates an embodiment of a dynamic peanut grading calibration card according to an embodiment of the disclosure, showing a distance image (top) and an automatically cropped/aligned image (bottom). In the figures, the peanuts are represented by black 2D peanut shapes but intended use is for actual sample peanuts to be scattered on the calibration card.

In embodiments, the grading calibration card can also include a QR code or other type of matrix barcode for accessing additional peanut information, such as illustrated in FIG. 14. This type of barcode can be scanned for ease of use in communicating to the software various peanut card identity parameters such as size, color, and peanut species/variety, as well as a link to a hosted website containing instructions for use or the developers' contact information. In other embodiments, the peanut grading calibration card is a dynamic peanut grading calibration card and does not have peanut placement markers, but instead includes 4 corner patches to allow for automatic alignment of the image after capture so that the image can be taken from any angle and cropped automatically in real time. The peanuts can be scattered or randomly placed in the blank area of the dynamic calibration card, such as illustrated in FIG. 14. In embodiments the peanuts can be placed anywhere on the card within the borders of the card, or, in embodiments, within borders established by the 4 corner patches. In embodiments, the color gradient/calibration is embedded within one or more of the 4 corner patches. In embodiments, the calibration is embedded in at least two of the corner patches. Embedding duplicate color calibration in 2-4 of the corner patches can also help compensate for lighting differences that occur across the card. In additional embodiments, the background of the dynamic calibration card may be designed (e.g., color, such as fluorescent green, etc.) to assist with background subtraction. Also, in such embodiments using a dynamic calibration card, the image is cropped automatically, such as illustrated in FIG. 9 and in real time so that the output can be video rather than just a single, static image. In an embodiment, the dynamic peanut grading card can also be inserted into the photobooth to obtain pictures with uniform lighting.

The PMGS also includes one or more cameras in data communication with the one or more computing devices. The camera can be within the computing device (e.g., a mobile computing device, such as, but not limited to a smartphone, tablet, laptop, etc.) or it can be separate/external, but still in data communication with the computing device.

The PMGS computing device is representative of one or more PMGS computing devices that may be in data communication with the remote computing environment as well as the various systems of the PMGS. The PMGS computing device may include, for example, a processor-based system such as embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability (e.g. NVidia Jetson TX2). The PMGS computing device may include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the computing device or may be connected to the PMGS computing device through a wired or wireless connection.

The PMGS computing device may be configured to execute various applications including peanut maturation determination application (PMDA), a camera, a controller, and/or other applications. The PMDA may be executed to do one or more of the following: receive one or more images from the one or more cameras, detect peanuts from the one or more images, automatically calibrate and adjust for lighting effects using the color gradient calibration bar, analyze the images and independently assign a peanut maturity grade for each of the plurality of peanuts from the one or more images based on at least the type of peanut and the color of the peanut as compared to the color gradient calibration bar, determine optimal dig times for each peanut detected in the one or more images based on the peanut maturity grade, and calculate, based on the optimal dig times of all of the peanuts, an optimal harvest time for a crop of peanuts from which the sample peanuts were taken. In embodiments the PMDA may do one or more of the following: analyze the images, assign, calibrate, determine and calculate data and outcome from the images using a trained deep-learning convolutional neural network (DL-CNN) or similar machine learning techniques (Artificial Intelligence). The DL-CNN may be based on models generated by machine learning using a collection of images. In some embodiments, the PMDA can be configured to interact with one or more remote databases systems that assist in the analysis from the obtained images and additional data.

The PMGS may also include a controller (not shown), which may be embodied as analog, digital, or mixed analog and digital processing circuitry and memory that direct the operation of the electromechanical components of the PMGS. In that sense, the controller can be an example of an embedded real-time control system in which control outputs are produced in response to control input conditions. The controller may be executed to send commands to the various systems of the PMGS (e.g., cameras, etc.). These applications may also be executed to receive and process data from the various systems within the PMGS, the remote computing environment, and/or other entities as can be appreciated. These applications may further be executed to cause the PMGS computing device to share or otherwise transmit the generated peanut grading data with the remote computing environment and/or another computing device or system.

Various data in the PMGS database are accessible to the PMGS computing environment. The PMGS database may be representative of a plurality of data stores as can be appreciated. The data stored in the PMGS database is associated with the operation of the various applications and/or functional entities described below.

Data stored in the PMGS database includes, for example, images, color grading rules, lighting calibration rules, maturity analysis rules, dig date and harvest date rules, and potentially other data and rules. The images can include a collection of images collected by the PMGS and/or images collected by other devices and input to the PMGS. The images can be used by the peanut maturity determination application (PMDA) in the analysis of images of sample peanuts on the peanut grading calibration card that are captured by the cameras for the detection, color assignment, and maturity calculation. The images can be used in retraining and/or refining the machine learning models implemented by the PMGS computing device and/or any other computing device as can be appreciated.

The color grading rules and maturity grading rules include rules and/or configuration data for the various algorithms and/or machine learning models used to detect, grade and analyze peanuts in each captured image. The control rules include rules and/or configuration data used to control the various systems of the PMGS. The control rules further include rules associated with the functioning and operation of the cameras and GPS receiver as well as the sending and receiving of data.

It should be noted that although shown in the PMGS computing device, in some embodiments, the peanut maturity determination application (PMDA) may be executed in the remote computing device, and/or other remote computing device. For example, the PMGS computing device may be configured to transmit the captured images to the remote computing environment and/or any other computing environment that is configured to execute the image analysis application for detecting, grading, and analyzing peanuts from the captured images.

The one or more cameras may be embodied as one or more cameras in the computing device or external to but in data communication with the computing device. Using the camera(s), still images and/or video may be relayed to the PMDA, where it may be analyzed. The images and/or video are relied upon by the PMDA to provide images of peanut color for use in determining the peanut color grading and maturity analysis. The cameras can comprise RGB cameras, multispectral cameras, and/or any other type of camera as can be appreciated.

Figure 3:
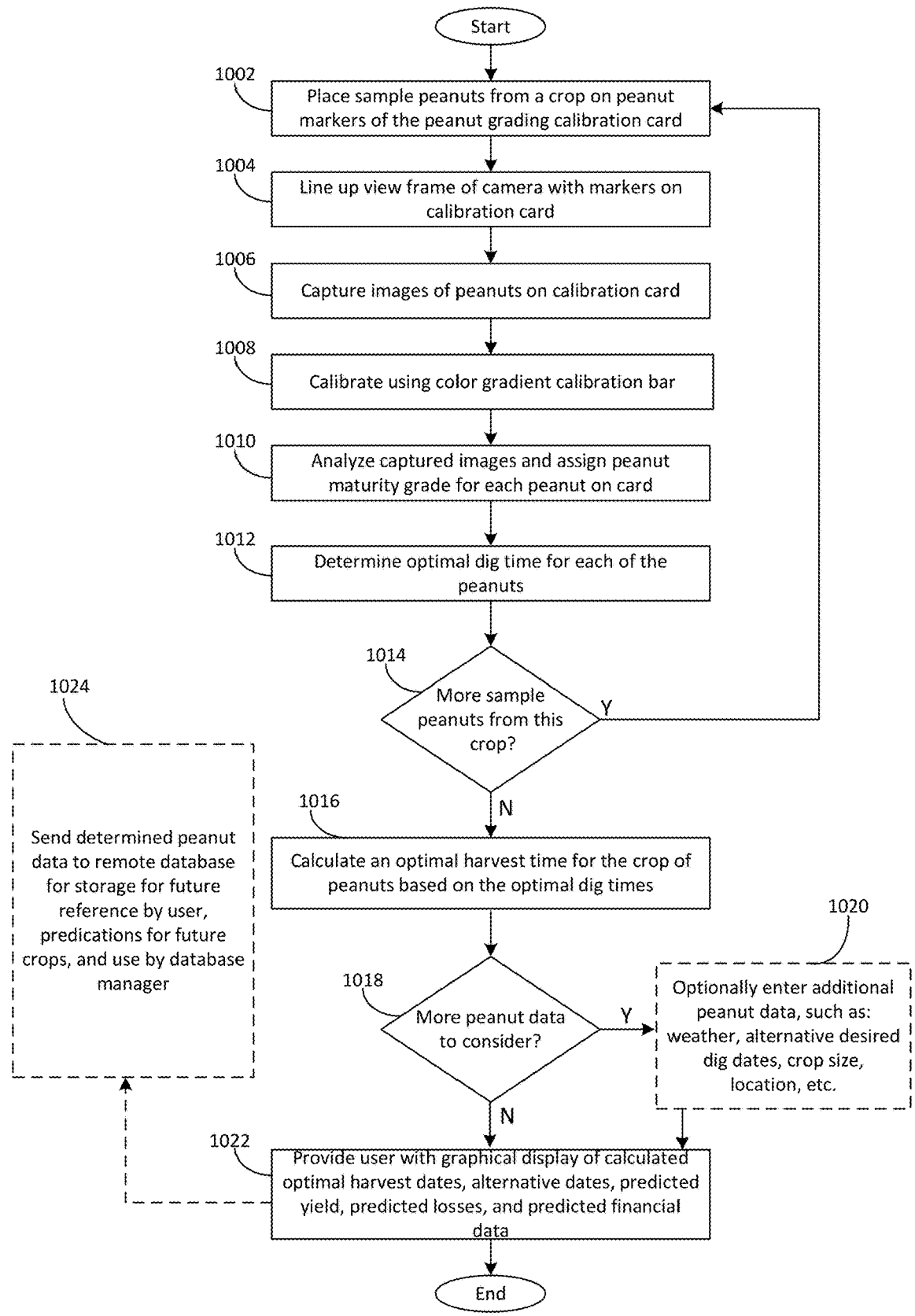
FIG. 3 is a flowchart illustrating one example of functionality implemented as portions of the peanut maturity grading system executed in a computing environment in the networked environment of FIG. 2 according to various embodiments of the present disclosure.

Referring next to FIG. 3, shown is a flowchart that provides an example of a method associated with the operation of the PMGS according to various embodiments. It is understood that the flowchart of FIG. 3 provides merely an example of the many different types of functional arrangements that may be employed to implement the operation of the PMGS as described herein.

At reference numeral 1002, sample peanuts (e.g., from a peanut crop to be harvested) are placed on/in peanut markers of a peanut grading calibration card (or simply on the card if it is an embodiment without markers). The peanuts can be manually placed or it is contemplated in some embodiments, that peanut placement could be automated or semi-automated. At 1004 the view frame of a camera is lined up with markers on the calibration card (this step is optional, one may also just visually line up the field of view). After aligning the camera, the camera is used to capture images of peanuts on the card at reference numeral 1006. After image capture, at reference numeral 1008, the PMDA calibrates the image color identification to minimize lighting effect variations using the color gradient calibration bar of the peanut grading calibration card. At reference 1010, captured images are analyzed by the PMDA (such analysis can occur before, after, or both before and after lighting/color calibration). During analysis, the PMDA compares/matches peanut color to the color gradient bar and assigns a peanut maturity grade for each peanut in the image. At 1012, the optimal dig time for each peanut is determined based on its maturity grade. To be clear, the purpose of the calibration bar/color gradient bar is to make the image of the sample uniform enough to compare with another sample taken under different lighting conditions, because the bar is also subject to those different conditions and can therefore minimize errors due to environmental control issues and variations.

If more peanuts are available from the sample, the process can start over at 1002 for another sample grouping of peanuts. It is contemplated that several peanut grading calibration cards with multiple peanuts could be used for a single crop grading and the data compiled for analysis of the crop as a whole. However, it is also contemplated that analysis of a single crop may not require even all of the space on a single card. Other variations are within the skill in the art. Once all of the data from sample peanuts from a crop is obtained, an optimal harvest time can be calculated (1016) for the crop of peanuts based on the optimal dig times for the sampled peanuts.

As shown in box 1020, additional data can optionally also be considered. Additional data can be entered by a user (e.g., farmer), and may include additional peanut data (e.g., size, aroma, weight, etc.), weather data, alternative desired dig dates (e.g., a conflict with the optimal dig date requires selection of an alternative harvest date), crop size, location, historical data, etc. Additional data can also be accessed/obtained from a remote database (e.g., historic data or local weather data, etc.). For instance, in embodiments, the PMDA can obtain (automatically or via request) weekly data from the Weekly National Posted Prices for Peanuts released by USDA for pricing, yield and loss analysis (see https://www.fsa.usda.gov/FSA/epasReports?area=home&subject=ecpa&topic=fta-pn; or https://www.fsa.usda.gov/Internet/FSA_EPAS_Reports/peanut090418.pdf). The optional additional data can be considered with the calculated maturity grades, optimal dig times and optimal harvest times to provide a user with a graphical display of calculated optimal harvest dates, alternative dates, predicted yield based on harvest date, predicted profits and loss based on alternative harvest dates, and other projected financial data.

Also, optionally (as shown at reference numeral 1024), determined peanut data and optional additional data can be sent to the remote database for storage for future reference by a particular user or general users or subscribers. Such data can also be used for predictions for future crop yields, best practices, and for use by a database manager for further analysis. This data can be provided to subscribers or other clients to predict market data and other financial data.

Figure 15:
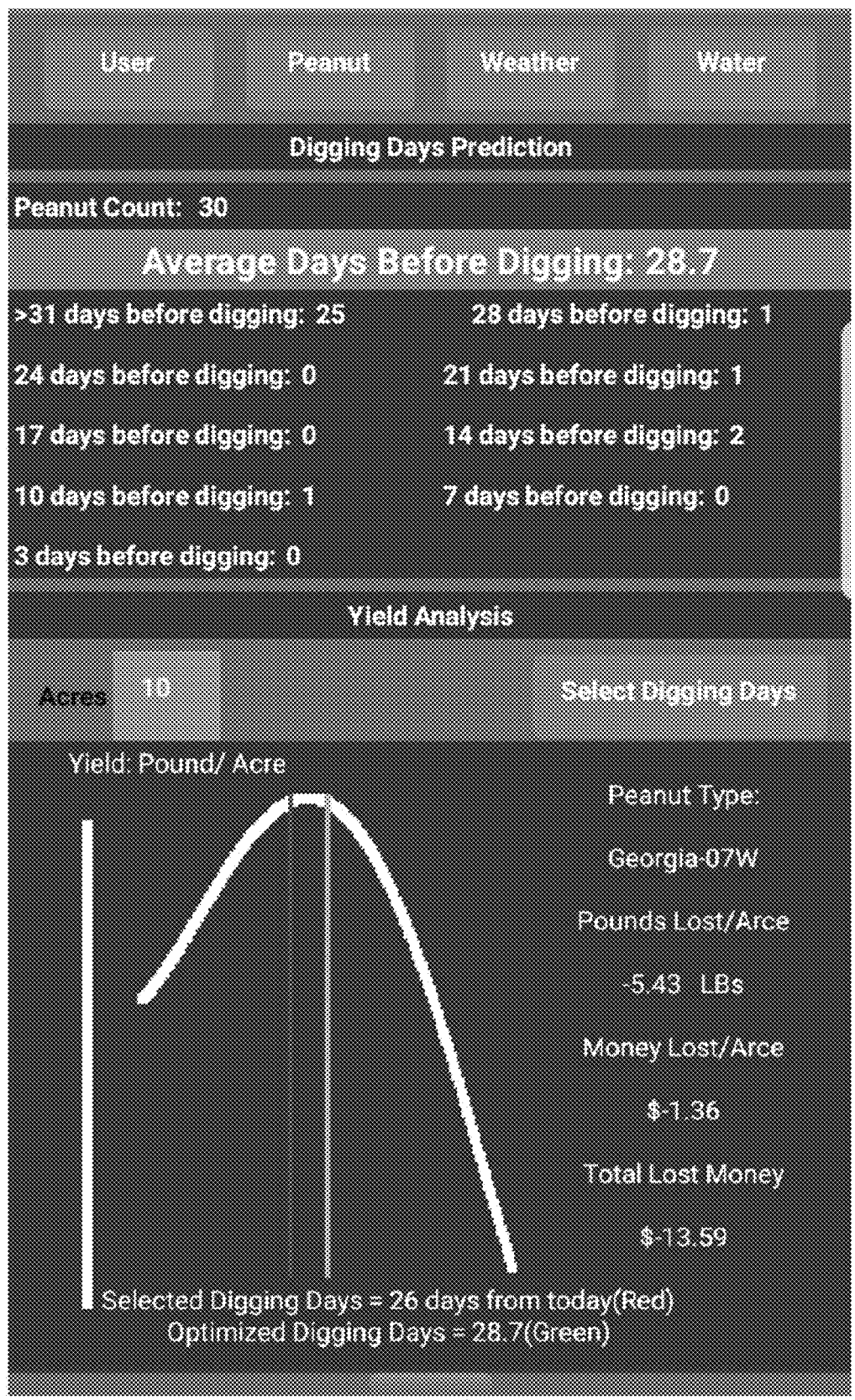
FIG. 15 illustrates pictorial diagrams of example user interfaces rendered by a user computing device in the networked environment of FIG. 2 in which a report is generated showing optimized digging days and additional yield and financial analysis based on the color grading results and showing that the user can also enter additional peanut data such as, peanut type, weather and water conditions.

FIG. 15 provides an example graphical report generated by the PMGS showing calculated optimized digging days for a user based on peanut grading results. As illustrated, the user can also select peanut type, weather and water condition. Based on this combined information, research data can be used to build a relationship between digging days and pounds lost/acre. Then, after the user selects preferred digging days, the PMDA can calculate the total lost revenue for user based on real-time peanut price and acres of peanut crop. This information is shown in a user interface display for the user as a reference and can also be uploaded to a dashboard and stored in a remote database to be used for general analysis to generate larger reports on market data.

Figure 16:
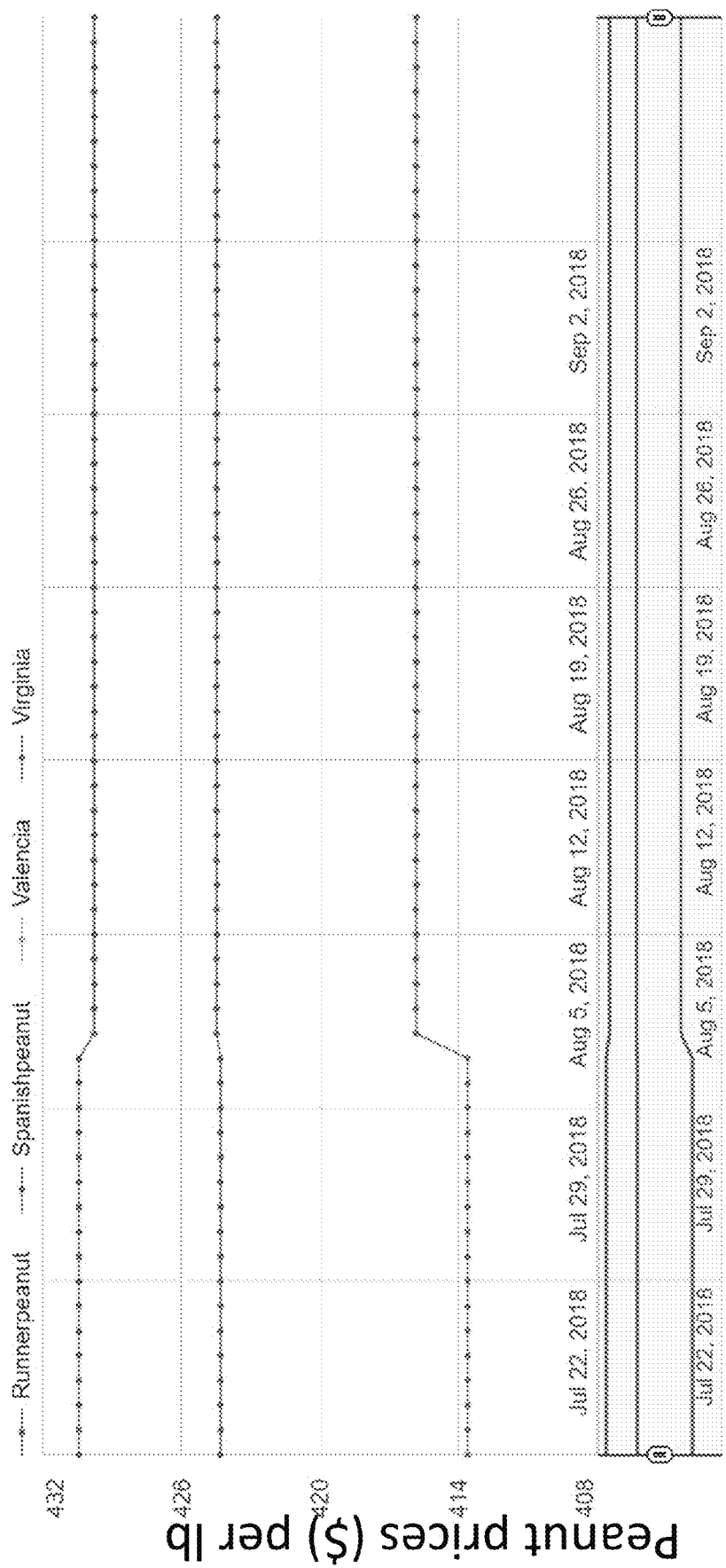
FIG. 16 illustrates a pictorial diagram of example user interface of a dashboard feature rendered by a user computing device in the networked environment of FIG. 2 in which a graphical report is generated that can provide real-time peanut price information.
Figures 17, 18:
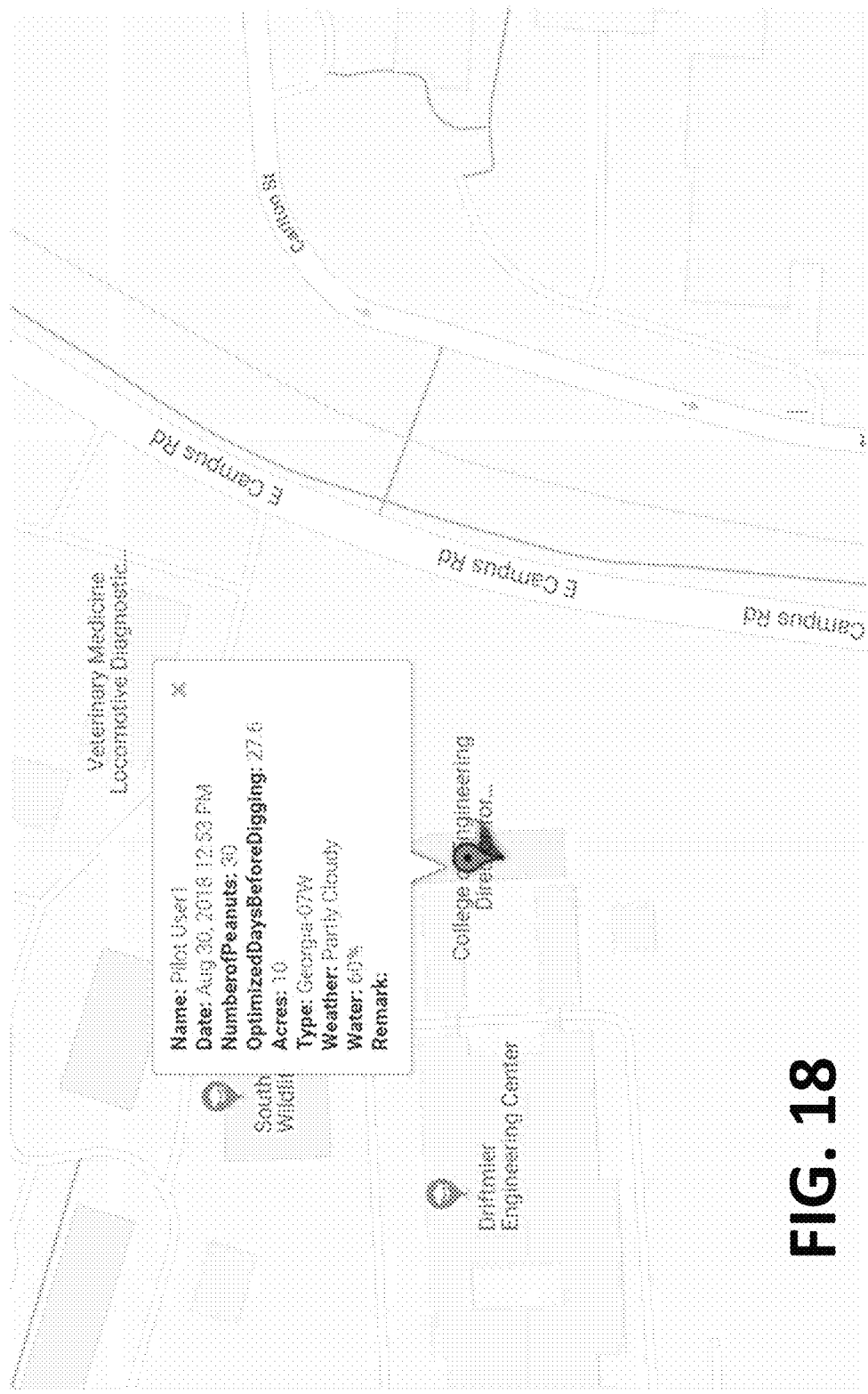
FIG. 17 illustrates a pictorial diagram of example user interfaces of a dashboard rendered by a user computing device in the networked environment of FIG. 2 where a user can input additional peanut data, such as, geographical location, peanut type, weather, and water conditions.
FIG. 18 illustrates a pictorial diagram of example user interfaces of a dashboard interface rendered by a user computing device or remote computing device in the networked environment of FIG. 2 where collected data is shown in a Google map to provide certain users with useful presentation data distribution.

FIG. 16 illustrates a view of a user interface from a dashboard showing real-time peanut price information for 4 types of peanuts. Users can acquire the price information by checking their application (app) on their computing device or dashboard for the peanuts they breed. FIG. 17 illustrates another view of a user dashboard for entering/collecting information from users such as date, time, specific crop location, number of peanuts used for grading analysis, preferred digging days, optimized digging days, total acres, peanut type, weather, and water conditions. In embodiments, each user has an individual dashboard, and this data can be collected and stored in a remote database to allow further statistical analysis to build prediction models to provide users with information to improve future yield. Additionally, it is envisioned that this data can be used collectively for predicting entire market yield and market price. FIG. 18 illustrates another embodiment of a display of peanut data that provides collected peanut data on a map showing the data in the crop location which can be useful for agencies or researchers to easily access and view peanut data distribution.

Figure 4:
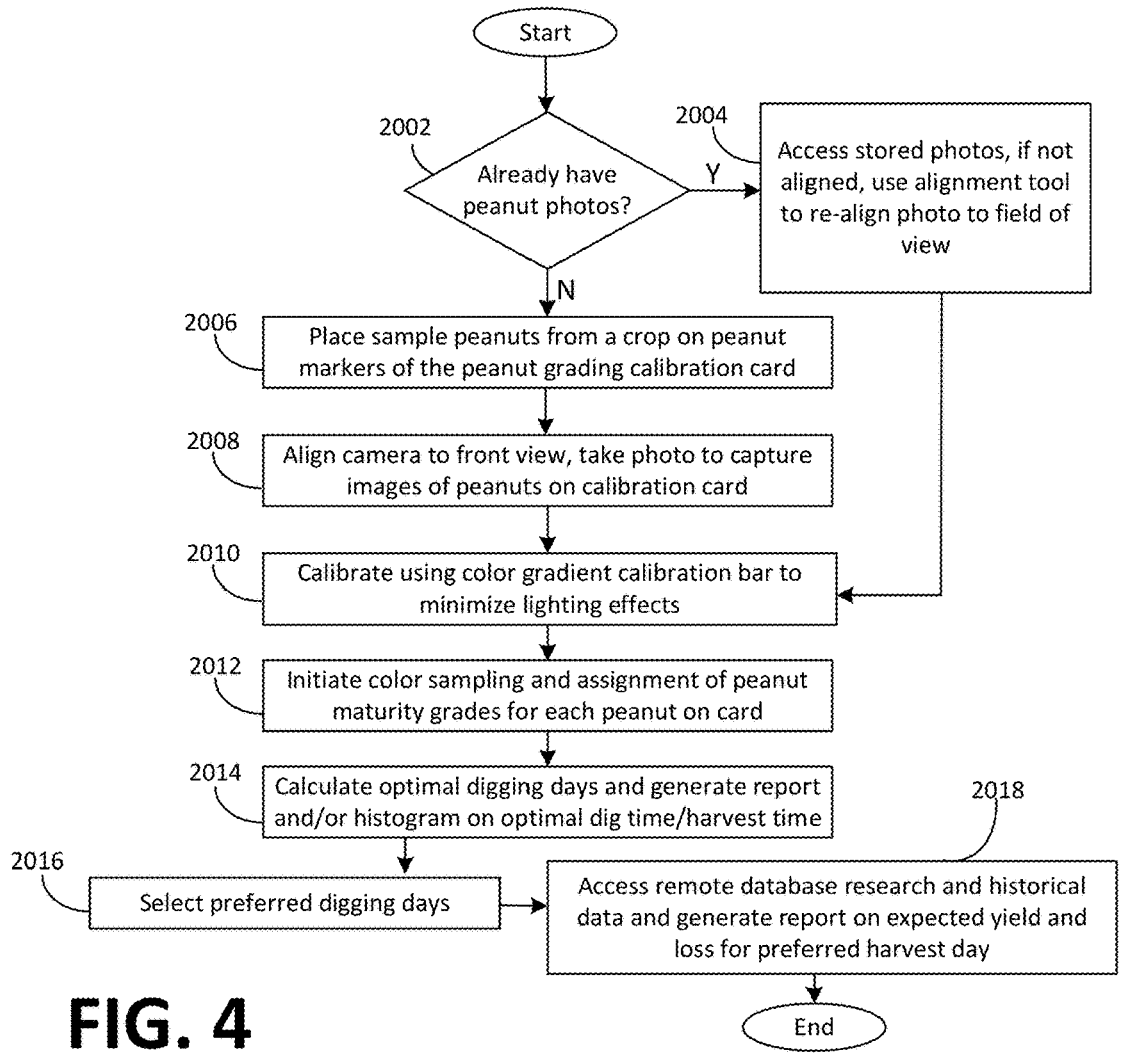
FIG. 4 is a flowchart illustrating one example of a method of determining peanut maturity, optimal harvest days, and projected outcomes using the peanut maturity grading system executed in a computing environment in the networked environment of FIG. 2 according to various embodiments of the present disclosure.

FIG. 4 is another flowchart that provides an embodiment of an example of a method associated with the operation of the PMGS according to various embodiments. At reference numeral 2002, if peanut photos of sample peanuts are already available, stored photos can be accessed at 2004 by the computing device. If the previously obtained images are not well aligned, alignment tools can be used to re-align photo to a more complete field of view. If photos do not already exist, or if they are insufficient, new photos can be taken of the sample peanuts. In box 2006, sample peanuts from a crop to be analyzed for maturity grading are placed on peanut markers of a peanut grading calibration card. At 2008, the camera is aligned (e.g., front view, landscape orientation is generally preferred, depending on the orientation of the calibration card) and a photo is taken with the camera to capture images of the peanuts on the calibration card. If needed after taking the photo in 2008, if the photo is not aligned well, a user can use the alignment tool (e.g., as set forth in box 2004) to re-align the photo to optimize he field of view. At 2010 the image can be calibrated to minimize lighting effects using the color gradient calibration bar. Then, color sampling is initiated at 2014 to assign peanut maturity grades for each peanut on the card. Based on the maturity grades, optimal digging days are calculated for each peanut and for the crop from which the samples were taken. A report can be generated with graphs, histograms, etc. presenting optimal dig/harvest times. A user can select a preferred digging day at 2016, which may or may not be the same as the determined optimal dig day provided by the PDMA. The PMGS can then access the remote database (box 2018) for research and historical data to generate a detailed report on expected yield and financial data for the preferred harvest day.

Although the flowcharts of FIGS. 3 and 4 illustrate a specific order of execution, it is understood that the order of execution may differ from that which is depicted. For example, the order of execution of two or more blocks may be scrambled relative to the order shown. Also, two or more blocks shown in succession in the flowcharts of FIGS. 3-4 may be executed concurrently or with partial concurrence. Further, in some embodiments, one or more of the blocks shown in FIGS. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations and related features are within the scope of the present disclosure.

Figure 5:
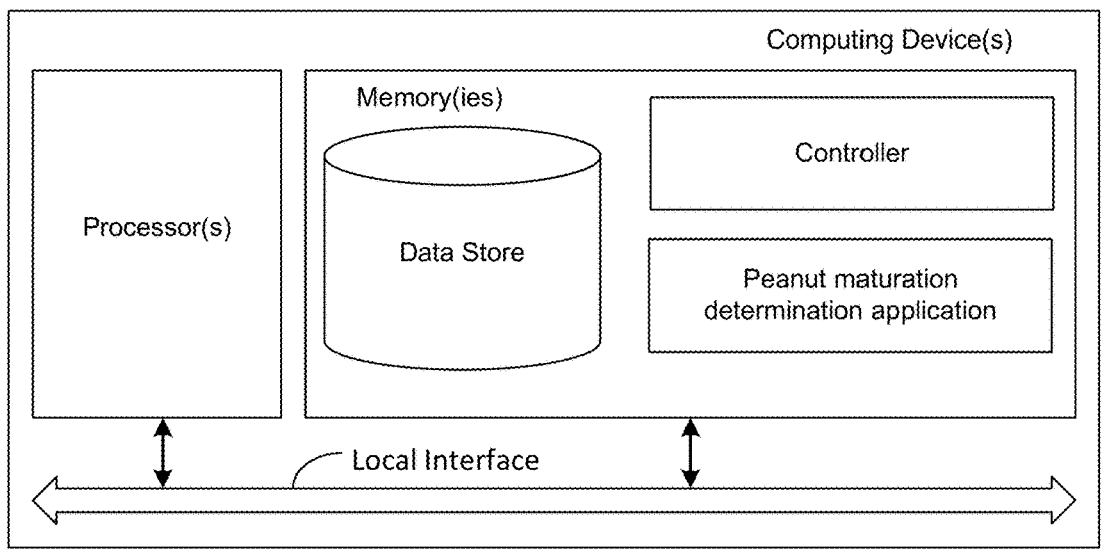
FIG. 5 is a schematic block diagram that provides one example illustration of a computing environment employed in the networked environment of FIG. 2 according to various embodiments of the present disclosure.
Figure 6A:
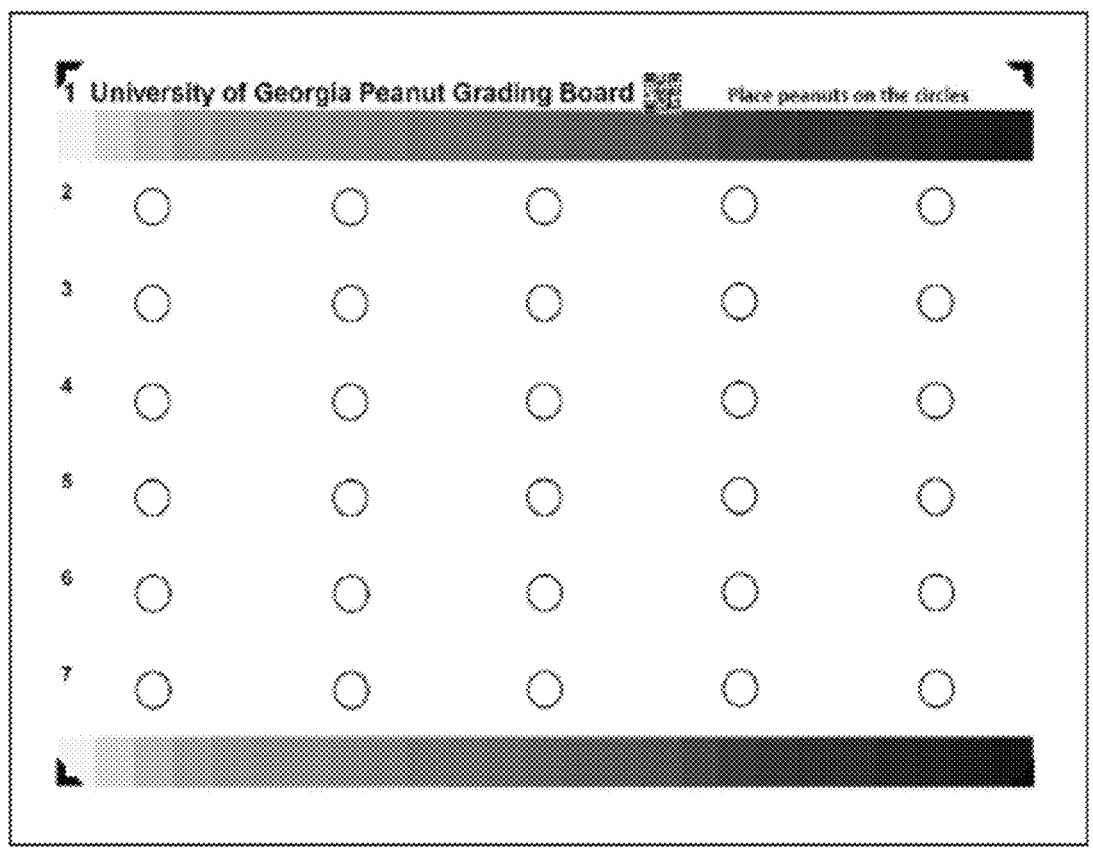
FIGS. 6A-6B illustrate an embodiment of a peanut grading calibration card of the present disclosure with and without peanuts.
Figure 6B:
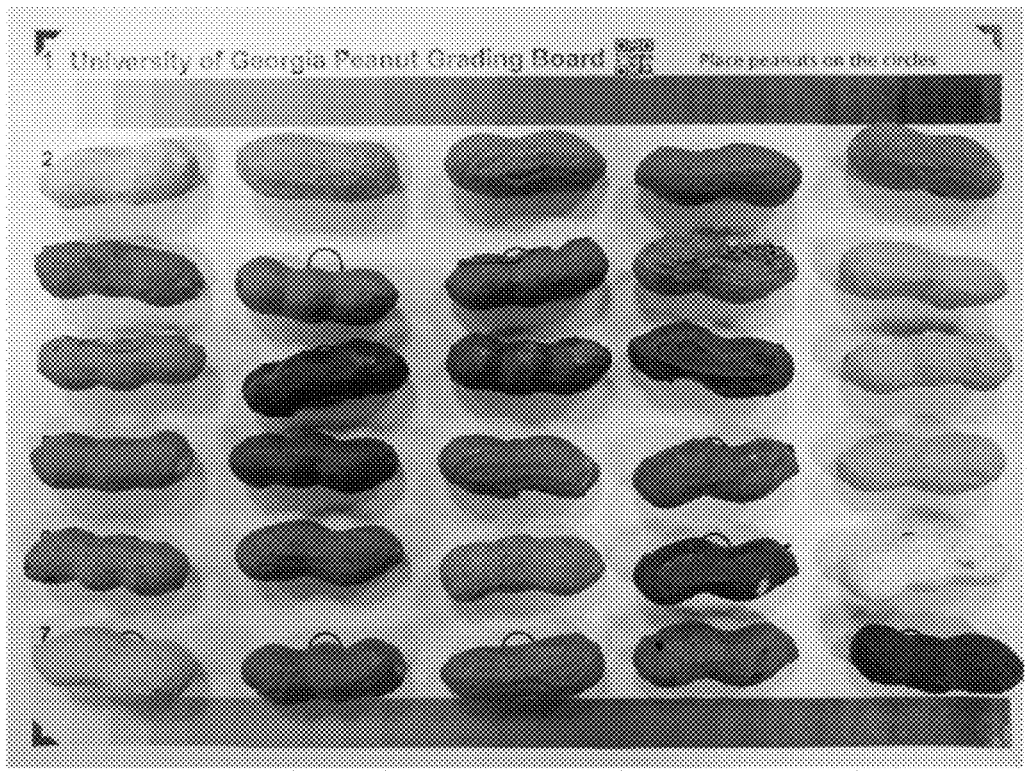

With reference to FIG. 5, shown is a schematic block diagram of the PMGS computing device according to an embodiment of the present disclosure. The PMGS computing environment includes one or more computing devices. Each computing device includes at least one processor circuit, for example, having a processor and a memory, both of which are coupled to a local interface. The local interface may comprise, for example, a data bus with an accompanying address/control bus or other bus structure as can be appreciated.

Stored in the memory are both data and several components that are executable by the processor. In particular, stored in the memory and executable by the processor are the controller, the peanut maturation determination application (PMDA), and potentially other applications. Also stored in the memory may be a PMGS database and other data. In addition, an operating system may be stored in the memory and executable by the processor.

It is understood that there may be other applications that are stored in the memory and are executable by the processor as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, Matlab, or other programming languages.

A number of software components are stored in the memory and are executable by the processor. In this respect, the term "executable" means a program file that is in a form that can ultimately be run by the processor. Examples of executable programs may be a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores, and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although the controller, image analysis, PMDA and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the PMDA. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Also, any logic or application described herein, including the controller and the image analysis application, that comprises software or code can be embodied in any non-transitory computer-readable medium for use by or in connection with an instruction execution system, such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM), including, for example, static random access memory (SRAM) and dynamic random access memory (DRAM) or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the controller and the image analysis application, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or in multiple computing devices.

Example 1

To evaluate an embodiment of the system for grading peanut maturity described above, result accuracy and repeatability were tested in the lab environment. To ensure the human errors were minimized, 60 peanut samples were painted with black, brown, yellow and orange respectively. The brown and orange were classified as intermediate peanuts in this study since they are at the intermediate stage of maturity.

The peanut grading board, as shown in FIGS. 9 and 12A-12C, was placed in different light conditions, increasing with brightness of the light source. A smartphone was used to scan the color of peanuts. 60 peanuts were used including 15 black, 15 brown, 15 orange and 15 yellow. The light intensity was presented in terms of lux number. The scan results were displayed in terms of total number as well as individual color group.

Figure 19A:
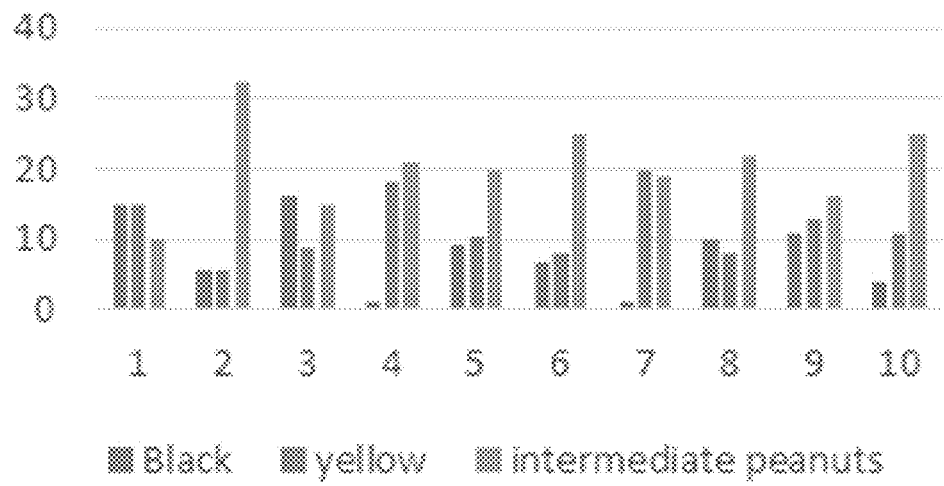
FIGS. 19A-19B show the test results of the accuracy test of example 1: the predicted number of different color groups (FIG. 19A), an example that demonstrates the overall accuracy of black color scanning (FIG. 19B).
Figure 19B:
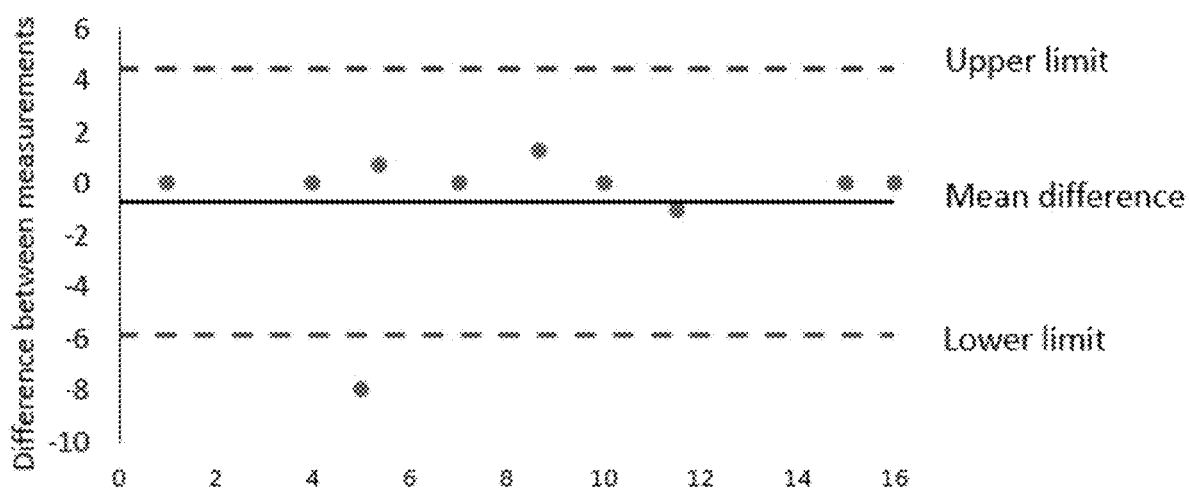

The accuracy test aims to assess the accuracy of the color detection with ten different combinations of randomly selected peanut samples. Table 1 shows the detailed combinations. For each test, the flip board was used to scan color of both sides of peanuts and the scan results were averaged. A Bland-Altman plot (AB plot) was used to check the accuracy. Equation 1 and 2 were used to obtain the mean accuracy with standard deviation. FIG. 19A shows the test results for accuracy. As this study mainly interested in the black peanuts (matured peanuts), FIG. 19B demonstrates the overall accuracy of black color scanning.

$$\text{Mean accuracy} = \frac{\text{mean difference from } AB \text{ plot}}{\text{number of peanuts tested}} \times 100\% \quad (1)$$

$$\text{Standard deviation of accuracy} = \frac{\text{standard deviation from } AB \text{ plot}}{\text{number of peanuts tested}} \times 100\% \quad (2)$$

TABLE 1 combinations of peanuts used for assessing the system accuracy

| Combinations | Black | Brown-Orange (intermediate peanuts) | Yellow |
| --- | --- | --- | --- |
| 1 | 15 | 10 | 15 |
| 2 | 5 | 25 | 5 |
| 3 | 16 | 15 | 9 |
| 4 | 1 | 21 | 18 |
| 5 | 8 | 12 | 10 |
| 6 | 7 | 25 | 8 |
| 7 | 9 | 11 | 20 |
| 8 | 10 | 22 | 8 |
| 9 | 12 | 15 | 13 |
| 10 | 4 | 26 | 10 |

Figure 20A:
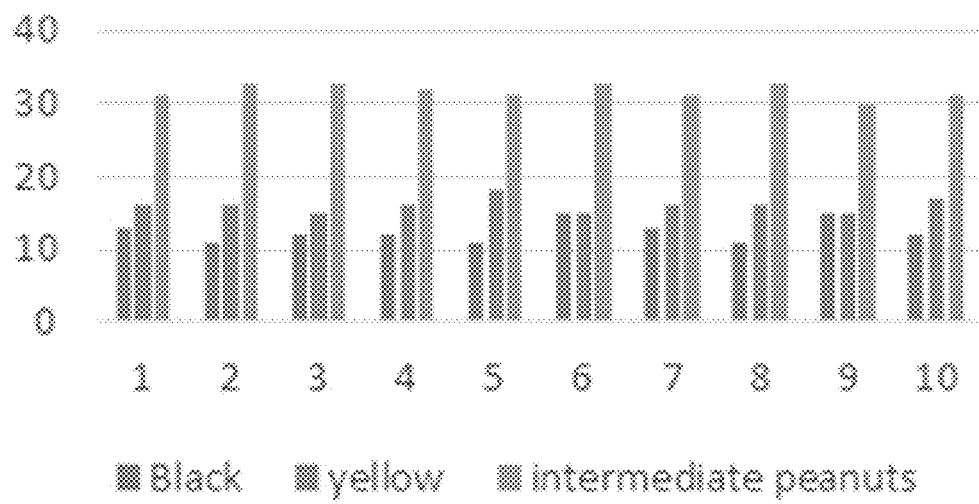
FIGS. 20A-20B show the test results of the repeatability test of example 1: the predicted number of different color groups (FIG. 20A), the Bland-Altman plot (FIG. 20B).
Figure 20B:
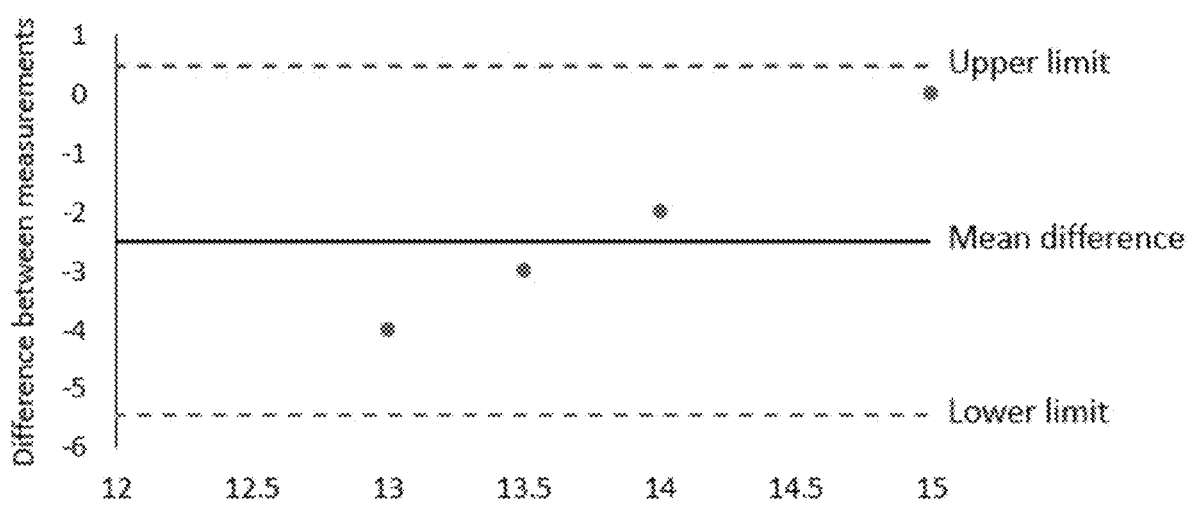

The repeatability test aims to whether the results of color distribution were consistent within the same group of peanuts. In this test, the 60 peanut samples including 15 black, 30 orange-brown, 15 yellow peanuts were used for this test. The peanut samples were randomly placed into different slots of the board and scanned for ten times. The scanned color results were compared with the actual painted color and a Bland-Altman plot was used to check the repeatability. Equation 3 and 4 were used to obtain the mean accuracy with standard deviation. FIG. 20A shows the test result of the predicted number of different color groups. FIG. 20B shows the Bland-Altman plot. Note in FIG. 20B there are ten points in total and some points were overlapped with each other. The intermediate peanuts are the brown and orange peanuts.

$$\text{Mean accuracy} = \frac{\text{mean difference from } AB \text{ plot}}{\text{number of peanuts tested}} \times 100\% \quad (3)$$

$$\text{Standard deviation of repeatability} = \frac{\text{standard deviation from } AB \text{ plot}}{\text{number of peanuts tested}} \times 100 \quad (4)$$

Figure 21:
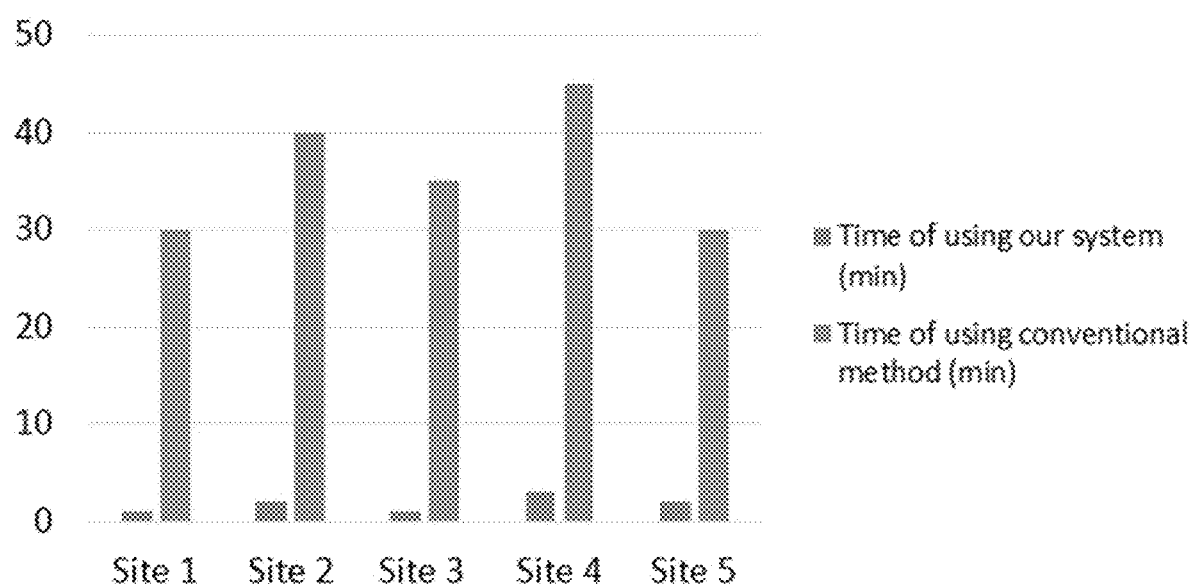
FIG. 21 illustrates the comparison between the average time spent using our system to obtain results and conventional method in example 1.

Several field tests were conducted to obtain the processing speed of maturity determination when the system was operated in the peanut growing sites. The time taken for using our system was compared to the conventional method is shown in FIG. 21. Some embodiments of the camera method make use of additional equipment such as the photo lighting control device to improve color accuracy. The reason is that the color of peanut can look differently under different lighting conditions, e.g. bright and sunny day vs, dark and cloudy day, meaning that color scanning results can vary depending on lighting conditions. Color calibration, while helpful, can be improved by the use of the photo lighting control device to make color more consistent. In order to make the color scanning process repeatable with reliable results, the peanut board was installed with four red makers, which could be aligned with the four red circles can be seen in the smartphone application.

The peanut maturity grading system was designed and fabricated for the purpose of improving the yield and quality of peanuts. The conventional, manual process was lengthy and produced unreliable and inconsistent results due to human errors. Two different tests were carried out to evaluate this system. One was the lab test which determined the accuracy and repeatability for sampling the most valuable black peanuts. The results over ten trials showed the average accuracy of 97.5% with standard deviation of 7.5%. On the other hand, the results over ten trials showed the average repeatability of 95% with standard deviation of 5%. The field test showed the average processing speed was 1-2 minutes by the system compared to 30 minutes using the conventional method.

Example 2

Field tests were conducted for evaluation of the system for grading peanut maturity. Human graders firstly placed a peanut grading board on top of the peanut profile board and carried out the conventional maturity test using visual inspection. After that, the peanut data logger was used to scan the peanut samples. The percentage of black peanuts in each sample was used to estimate the harvest day in this study as this is a typical practice. Overall, there were 52 on-site tests from Aug. 29 to Nov. 1, 2019. The images of 52 samples were uploaded to https://gii.uga.edu/gpc/. The discrepancies between human graders and the smartphone app were assessed in terms of three sets of errors: the percentage of black-and-brown peanuts, the percentage of black peanuts and the total number of peanuts. All error calculations were represented using root mean square errors.

Figure 22A:
FIGS. 22A-22B illustrate peanut images of groups of samples from different growing fields in example 2.
Figure 22B:
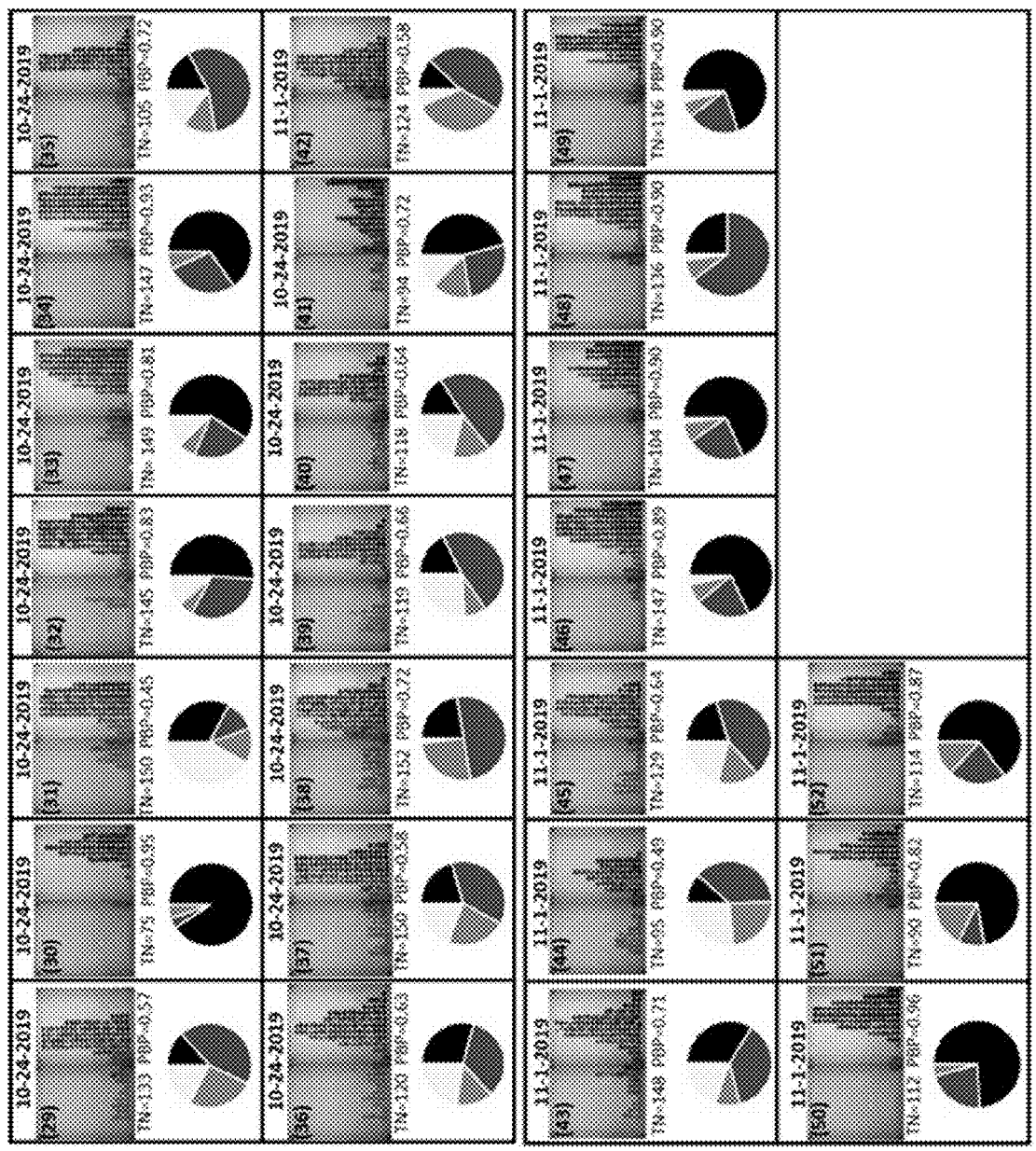

FIGS. 22A-22B shows the image scanning results. The information about the total number of peanuts (TN) and the proportion of black peanuts (PBP) is displayed underneath each raw image. If the PBP is 0, it means the peanut sample is 0% mature and no black peanuts are present. If the PBP is 1, it means the peanut sample is 100% mature and all peanuts are black.

The app performance was evaluated using results from human graders as the ground truth. For estimating the number of black-and-brown peanuts, the app had an overall error of 9.0%, and the standard deviation was 8.0%. For estimating the number of black peanuts, the app had an error of 18.8%, and the standard deviation was 11.6%. For estimating the total number of peanuts, the app had an error of 5.8%, and the standard deviation was 0.8%. The detailed sample-by-sample comparison is shown in FIG. 23A-23C.

In this example, the peanut grading board has four registration makers at the corners of the peanut grading board to help with registration between the board and the smartphone camera (FIG. 24A). The markers ensure proper alignment between the smartphone and peanut grading board so that each peanut is in the boundary of each red square for image capture and later analysis. FIG. 24B shows that misalignments in a scan could result in an inaccurate field of view outside the peanut samples, affecting the scan outcome.

The photo lighting control device used in this example presented minor uneven light distribution because the light source had a directional light path. Another approach would be to use LED light strips covering the entire interior wall surface of the photobooth.

During the field test, only one side of the peanut samples was scanned using the smartphone app, so the color information of the rear side of peanuts was not considered in the scan. One solution would be to perform a scan on both sides of the peanut samples to obtain full information about the peanut surface color. In addition, the current method for color detection is based on a rectangular field of view, which could potentially include unnecessary background color when misalignment occurs between the scan area and the peanut sample. Therefore, sample segmentation could be used to ensure each peanut contour could be profiled appropriately for accurate color extraction. Furthermore, the saddle area of a peanut carries essential information about its maturity status; therefore, in embodiments, color interpretation could be prioritized on that specific area of the peanut, which could be implemented with a strong segmentation algorithm to extract the color information from that area.

The discrepancies found between human and smartphone app results were partially attributed to the inter-rater reliability of the manual grading process because each grader can have slightly different interpretations of colors. Moreover, although color was a predominant factor in determining the maturity level of peanuts, there were other factors that the human graders considered when making the judgment on the peanut maturity level.

The user interface and the workflow of the data logging system could be further optimized to shorten the learning curve and reduce the operating time. Also, the system is currently designed for only a few types of peanuts, which could be made more adaptable to other varieties.

A portable data logging system was designed and fabricated for the purpose of collecting and uploading peanut sample information onto a remote database for harvest analysis. Compared with human graders, the embodiment of the system of the present disclosure that was tested demonstrated an error of 9.0% with an SD of 8.0% in calculating the percentage of black-and-brown peanuts, an error of 18.8% with an SD of 11.6% in calculating the percentage of black peanuts, and an error of 5.8% with an SD of 0.8% in calculating the total number of peanuts.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A system for grading peanut maturity comprising:
a peanut grading board comprising an array of peanut placement slots, the peanut grading board configured for placement of a plurality of sample peanuts on/in the slots of the peanut placement array;
a photo lighting control device comprising a housing and a light source, the housing configured with a base, a top, and walls having an interior surface, wherein the base has dimensions configured to accommodate the peanut grading board comprising an array of peanuts placed thereon, wherein the top has dimensions configured to accommodate a camera and an opening configured to accommodate a lens of the camera; and
at least one color gradient calibration bar positioned such that said calibration bar is visible within a field of view of the camera.

2. The system for grading peanut maturity of claim 1, wherein the interior surface of the lighting control device comprises a reflective material.

3. The system for grading peanut maturity of claim 1, wherein the light source is configured to illuminate the interior of the photo lighting control device such that consistent lighting is provided to the peanuts on the peanut grading board.

4. The system for grading peanut maturity of claim 1, wherein the color gradient calibration bar located on the peanut grading board, positioned within the photo lighting control device, or both.

5. The system for grading peanut maturity of claim 1, wherein the color gradient calibration bar is mounted within the photo lighting control device at the base of the housing such that the color gradient calibration bar is not covered or obstructed when the peanut grading board is inserted at the base of the housing.

6. The system for grading peanut maturity of claim 1, wherein the camera is a mobile device or a smartphone comprising a camera.

7. The system for grading peanut maturity of claim 1, wherein the peanut grading board is a first peanut grading board and the system further comprises a second peanut grading board configured to sandwich the peanut sample between the first and second peanut grading boards such that the plurality of peanuts placed on the first peanut grading board are held in place as the first and second peanut grading boards together are turned over and a reverse side of the peanut sample exposed to be imaged.

8. The system for grading peanut maturity of claim 1, wherein the peanut grading board comprises a transparent or translucent material.

9. The system for grading peanut maturity of claim 1, wherein:
the photo lighting control device is extended at the base beneath a position configured to accommodate the peanut grading board, the base further configured to accommodate the camera or a second camera; and
the light source of the photo lighting control device comprises a first and second light source, the first light source positioned above the location for the peanut grading board and the second light source positioned below the location for the peanut grading board.

10. A method for grading peanut maturity comprising:
in the system of claim 1, positioning the peanut grading board within the housing of the photo lighting control device, the peanut grading board having a plurality of sample peanuts from a peanut crop arranged thereon;
capturing, via the camera, one or more images of the plurality of sample peanuts on the peanut grading board and at least one color gradient calibration bar;
analyzing, via the at least one computing device, the one or more images captured by the camera, wherein the analyzing includes automatically calibrating and adjusting for lighting effects using the color gradient calibration bar, automatically detecting the plurality of peanuts, automatically assigning a peanut maturity grade to each peanut based on at least a peanut type and a peanut color as compared to the color gradient calibration bar, and automatically determining an optimal dig time for each peanut based at least on the peanut maturity grade for that peanut; and
generating, via the at least one computing device, a report providing optimized harvest times for the peanut crop based at least on the optimal dig times for the plurality of sample peanuts detected and analyzed.

11. The method of claim 10, further comprising transmitting, via the at least one computing device, one or more items of peanut data to a remote computing device, the items of peanut data selected from the group consisting of: determined optimal harvest times, weather data, crop geographical location data, and peanut crop data from prior years.

12. The method of claim 10, wherein the report further provides one or more projected data items selected from the group of projected data items consisting of: expected yield for different harvest dates, expected peanut price based on harvest date, and expected profit and loss data based on harvest date.

13. The method of claim 10, wherein the camera is a mobile device or smartphone comprising the camera, the mobile device or smartphone being one of the at least one computing device, and the mobile device or smartphone configured as a user interface.

14. A non-transitory computer-readable computer product comprising program code executable in one or more computing devices that, when executed, directs the one or more computing devices to:
receive one or more images comprising a plurality of sample peanuts arranged in an array and a color gradient calibration bar;
detect the plurality of peanuts from the one or more images;
automatically calibrate and adjust for lighting effects using the color gradient calibration bar;
analyze the one or more images and independently assign a peanut maturity grade for each of the plurality of peanuts from the one or more images based on at least a peanut type and a peanut color as compared to the color gradient calibration bar; and
generate a report comprising the peanut maturity grade for the plurality of peanuts.

15. The non-transitory computer-readable computer product of claim 14, wherein the program code further causes the at least one computing device to:
determine an optimal dig time for each of the plurality of peanuts in the one or more images based on the peanut maturity grade; and
calculate, based on the optimal dig times for all of the peanuts detected an image of the one or more images, an optimal harvest time for a crop of peanuts from which the sample peanuts were taken.

16. The non-transitory computer-readable computer product of claim 14, wherein the report further comprises an optimal harvest time for a crop of peanuts from which the sample peanuts were taken.

17. The non-transitory computer-readable computer product of claim 14, wherein the report further comprises one or more projected data items selected from the group of projected data items consisting of: expected yield for different harvest dates, expected peanut price based on harvest date, and expected profit and loss data based on harvest date.

18. The non-transitory computer-readable computer product of claim 14, wherein the program code further causes the at least one computing device to transmit one or more items of peanut data to a remote database, the items of peanut data selected from the group consisting of: peanut type, peanut maturity grade, calculated optimal harvest time, actual crop harvest time, crop location, crop water history, crop weather history, predicted crop yield, and actual crop yield.

19. The non-transitory computer-readable computer product of claim 14, wherein the program code further causes the at least one computing device to transmit one or more items of peanut data to a remote computing device, the items of peanut data selected from the group consisting of: determined optimal harvest times, weather data, crop geographical location data, and peanut crop data from prior years.

20. A system for grading peanut maturity comprising:
a peanut grading board comprising an array of peanut placement slots, the peanut grading board configured for placement of a plurality of sample peanuts from a peanut crop in the slots of the peanut placement array;
a photo lighting control device comprising a housing and a light source, the housing configured with a base, a top, and walls having an interior surface, wherein the base has dimensions configured to accommodate the peanut grading board comprising an array of peanuts placed thereon, wherein the top has dimensions configured to accommodate a camera and an opening configured to accommodate a lens of the camera such that the camera is positioned to capture one or more images of the array of peanuts;

at least one color gradient calibration bar positioned such that said calibration bar is visible within a field of view of the camera, such that the calibration bar is captured in the one or more images of the array of peanuts; and a program code executable by at least one computing device being in data communication with the camera, that, when executed, directs the at least one computing device to:

receive the one or more images from the camera;

analyze the one or more images and independently assign a peanut maturity grade for each of the plurality of peanuts from the one or more images based on at least a peanut type and a peanut color as compared to the color gradient calibration bar;

determine an optimal dig time for each of the plurality of peanuts in the one or more images based on the peanut maturity grade; and generate a report comprising the peanut maturity grade for the plurality of peanuts.

* * * * *